United States Patent
Tena et al.

(10) Patent No.: US 10,301,431 B2
(45) Date of Patent: May 28, 2019

(54) METHOD OF PRODUCING A THERMALLY REARRANGED PBX, THERMALLY REARRANGED PBX AND MEMBRANE

(71) Applicant: Helmholtz-Zentrum Geesthacht Zentrum für Material- und Küstenforschung GmbH, Geesthacht (DE)

(72) Inventors: Alberto Tena, Valladolid (ES); Sofia Rangou, Hamburg (DE); Sergey Shishatskiy, Geesthacht (DE)

(73) Assignee: HELMHOLTZ-ZENTRUM GEESTHACHT ZENTRUM FÜR MATERIAL-UND KÜSTENFORSCHUNG GMBH, Geesthact (DE)

( * ) Notice: Subject to any disclaimer, the term of this patent is extended or adjusted under 35 U.S.C. 154(b) by 19 days.

(21) Appl. No.: 15/388,074

(22) Filed: Dec. 22, 2016

(65) Prior Publication Data

US 2017/0166699 A1    Jun. 15, 2017

Related U.S. Application Data

(63) Continuation of application No. PCT/EP2016/051415, filed on Jan. 25, 2016.

(30) Foreign Application Priority Data

Jan. 29, 2015  (EP) .................................... 15153089

(51) Int. Cl.
| | | |
|---|---|---|
| C08G 73/00 | (2006.01) | |
| C08G 73/22 | (2006.01) | |
| B01D 71/62 | (2006.01) | |
| C08G 73/18 | (2006.01) | |
| B01D 53/22 | (2006.01) | |
| B01D 69/12 | (2006.01) | |

(52) U.S. Cl.
CPC ........... *C08G 73/22* (2013.01); *B01D 53/228* (2013.01); *B01D 69/12* (2013.01); *B01D 71/62* (2013.01); *C08G 73/18* (2013.01)

(58) Field of Classification Search
None
See application file for complete search history.

(56) References Cited

U.S. PATENT DOCUMENTS

2012/0305484 A1   12/2012  Freeman et al.
2013/0237619 A1   9/2013   Blum et al.

FOREIGN PATENT DOCUMENTS

EP      2345685 A2     7/2011

OTHER PUBLICATIONS

Yang et al., A New Synthetic Route to Benzoxazole Polymer via Tandem Claisen Rearrangement, Macromolecules, 2001, pp. 6545-6547.
Park et al., Polymers with Cavities Tuned for Fast Selective Transport of Small Molecules and Ions, Science vol. 318, Oct. 12, 2007, pp. 254-258.
Han et al., Thermally Rearranged (TR) Polybenzoxazole: Effects of Diverse Imidization Routes on Physical Properties and Gas Transport Behaviors, Macromolecules, 2010 pp. 7657-7667.
Dawson et al., Nanoporous Organic Polymer Networks, Progress in Polymer Science No. 37, 2012, pp. 530-563.
Calle et al., The Relationship Between the Chemical Structure and Thermal Conversion Temperatures of Thermally Rearranged (TR) Polymers, Polymer No. 53, Apr. 22, 2012 , pp. 2783-2791.
Sanders et al.,Gas Permeability, Diffusivity, and Free Volume of Thermally Rearranged Polymers Based on ,3,3-Dihydroxy-4,4-Diamino-Biphenyl (HAB) and 2,2-bis-(3,4-dicarboxyphenyl) Hexafluoropropane Dianhydride (6FDA), Journal of Membrane Science 409, 2012, pp. 232-241.
Guo et al., Synthesis and characterization of Thermally Rearranged (TR) polymers: influence of ortho-positioned functional groups of polyimide precursors on TR process and gas transport properties, Journal of Materials Chemical A, Nov. 15, 2002, pp. 262-272.
Sanders et al., Energy-efficient polymeric gas separation membranes for a sustainable future: A review, Polymer No. 54, Jul. 3, 2013, pp. 4729-4761.
Khan et al.,Cross-linking of Polymer of Intrinsic Microporosity (PIM-1) via nitrene reaction and its effect on gas transport property, European Polymer Journal No. 49, Sep. 27, 2013, pp. 4157-4166.

*Primary Examiner* — Ana L. Woodward
(74) *Attorney, Agent, or Firm* — Murtha Cullina LLP

(57) ABSTRACT

A method of producing a thermally rearranged polybenzoxazole, polybenzimidazole or polybenzothiazole (collectively denominated "TR PBX"), thermally arranged PBX and membranes including the same.

12 Claims, 18 Drawing Sheets

(State of the art)

(State of the art)

METHOD OF PRODUCING A THERMALLY REARRANGED PBX, THERMALLY REARRANGED PBX AND MEMBRANE

CROSS REFERENCE TO RELATED APPLICATIONS

The present application is a continuation application of and claims priority to PCT/EP2016/051415, filed on Jan. 25, 2016, which is a PCT application of and claims priority to EP Application No. 15153089.6, filed on Jan. 29, 2015, each of which are incorporated herein in their entireties.

FIELD

The present invention concerns a method of producing a thermally rearranged polybenzoxazole, polybenzimidazole or polybenzothiazole (collectively denominated "TR PBX"), thermally arranged PBX and membranes comprising the same.

The present invention describes an improvement of a class of polymers produced by thermal rearrangement. The polymer sustaining chemical functionalization is an ortho-functional aromatic polyimide or polyamide with separation properties for gas/gas, liquid/gas or liquid/liquid similar or higher than the precursor polymer. These polymers are attributed to a new class of materials known as thermally rearranged (TR) polymers, which have polybenzoxazole (PBO), polybenzimidazole (PBI) or polybenzothiazole (PBT) structures. Within the present application PBO, PBI and PBT are summarily denoted as "PBX".

BACKGROUND

Although much research has been done in the field of membrane separation and polymers, there have been only incremental advances in gas separation membranes. Increase in selectivity for one gas over another is generally obtained at the cost of simultaneous decrease in permeability and vice versa. Many polymers that exhibited attractive combinations of permeability and selectivity in single gas measurements have failed to show similar properties when tested in gas mixtures due to phenomena such as plasticization, which can sharply reduce selectivity as the concentration of dissolved gas in the polymer increases, typically with increasing feed pressure.

Microporous materials are in the forefront of research because of their potential application into gas storage, separation, catalysis, energy conversion and generation, and microfluidic application, etc. In most of the cases such microporous materials are inorganic (e.g. silica, alumina and zeolites). Recently, advances have been made in the field of coordinated frameworks such as metal-organic frameworks (MOFs), covalent-organic frameworks (COFs), porous aromatic frameworks (PAFs), and conjugated-microporous polymers (CMPs). Common characteristic of these materials is their microporous structure as well by their high internal surface areas. An overview over such materials can be found in D. F. Sanders et al., "*Energy-efficient polymeric gas separation membranes for a sustainable future: A review*", *Polymer* 54 (2013) 4729-4761.

Polymers are generally considered organic non-porous materials. Internal microporosity may result from chain mobility and substantial chain packing of covalent bonds. Lately, several works have been directed towards high free volume polymers known as microporous or nanoporous organic polymers, e.g., R. Dawson et al., "*Nanoporous organic polymer networks*", *Progress in Polymer Science* 37 (2012) 530-563.

Conventional polymers have well-packed structures. Glassy polymers are comprised of highly distorted structures, e.g., polymers with intrinsic microporosity (PIMs), as, e.g., described in M. M. Khan et al., "*Cross-linking of Polymer of Intrinsic Microporosity (PIM-1) via nitrene reaction and its effect on gas transport property*", *European Polymer Journal* 49 (2013) 4157-4166.

H. B. Park et al. first disclosed in "*Polymers with Cavities Tuned for Fast Selective Transport of Small Molecules and Ions*", *Science* 318 (2007) 254-258 a method for producing thermally rearranged (TR) polymers featuring 0.4-0.9 nm free volume elements in the polymer matrix. Due to the easy synthesis and fabrication, these highly permeable polymers are promising candidates for large scale industrial separation processes, e.g., for carbon dioxide capture and storage (CCS), industrial nitrogen generation, ammonia production, refinery process and natural gas sweetening, which have the potential of minimizing process complexity and reducing energy consumption. These materials exhibit high $CO_2$ permeability, good $CO_2/CH_4$ permselectivity and excellent resistance to $CO_2$-induced plasticization. For example, for the fluorinated TRO-1 polymer (TRO="thermally rearranged oxazol") of this disclosure was reported a $CO_2$ permeability close to 2000 Barrer (or $1.5 \cdot 10^{-14}$ m$^2$/s Pa) and a $CO_2/CH_4$ selectivity of 40, with no evidence of plasticization up to 15 bar.

Thermally rearranged (TR) polymers are usually formed from precursor polyimides or polyamides with an ortho-functional aromatic group void. During the rearrangement the ortho-functional group of the polyimide is chemically linked through an O, N or S moiety of a second group that is lost while leading to the desired PBX. The properties of aromatic polyimides are influenced by this ortho-functional group void.

The TR polymers having polybenzoxazole (PBO) structures described in the above-referenced H. B. Park et al., *Science*, 2007, article are formed via molecular thermal rearrangement of precursor poly(hydroxyimide)s (PHI), i.e., aromatic polyimides containing hydroxyl groups (or —SH- or —NH-groups) in ortho-position to the imide ring, as shown in FIG. 1 and FIG. 2. Upon heating at high temperatures typically greater than 350° C. in an inert atmosphere (such as N2 or Ar), the aromatic rings thermally rearrange to PBOs with quantitative loss of carbon dioxide. The membrane performance resulting from the TR process is markedly enhanced, following from the unavoidable insolubility of these PBO structures. Starting from a soluble poly(hydroxyimide) and proceeding with the thermal treatment has rendered the industrial processing such as flat membrane production or hollow fiber spinning possible. The procedure is similar in the case of polybenzothiazoles (PBT) and polybenzimidazoles (PBI), as can be seen from FIG. 1, where the two doubly bound O-atoms of the imide group are lost during the rearrangement together with carbon atoms as $CO_2$, whereas X (=O, S, N) is integrated into the heterocycle.

In S. H. Ran et al., "*Thermally Rearranged (TR) Polybenzoxazole: Effects of Diverse Imidization Routes on Physical Properties and Gas Transport Behaviors*", *Macromolecules* 43 (2010) 7657-7667, it was shown that the distortion of the polyimide chain into a rigid-rod polymer during the structural rearrangement in the solid state leads to the formation of microcavities in the range of 0.3-0.4 nm and 0.7-0.9 nm, where smaller sizes could be beneficial for selective transport of different molecules and the larger for gas diffusion. The microporosity in terms of size and distribution of the TR polymers is prone to be controlled by the fabrication conditions in terms of treatment time and temperature, in contrast to commonly used microporous materials.

The TR polymer's combination of exceptional high selectivity and high permeability within the interconnected free volume elements allows to escape the hitherto limiting trade-offs between selectivity and permeability for example for $O_2/N_2$, $CO_2/N_2$ or $CO_2/CH_4$, as well as for gas/liquid or liquid/liquid separations.

For example, natural gas purification is one of the largest gas separation applications in the world. Nearly 100 trillion scf (standard cubic feet), or ca. 2.83 trillion standard cubic meters of natural gas are produced worldwide each year, and approximately 17% of that requires treatment for $CO_2$. While membranes constitute less than 5% of the market, improving membrane permeability, selectivity, and chemical resistance can greatly increase this market share.

Despite the fact that there have been several attempts to improve the properties by using different structures or by studying the effect of the synthesis route in the properties as, e.g., in S. H. Ran et al., *Thermally Rearranged (TR) Poly-benzoxazole: "Effects of Diverse Imidization Routes on Physical Properties and Gas Transport Behaviors"*, Macromolecules, 43 (2010) 7657-7667, the main disadvantage of this kind of polymers is the high temperature necessary to achieve this rearrangement, namely generally >400° C.

The thermal rearrangement or conversion temperature ($T_{TR}$) greatly influences the polymer and membrane properties and is one of the crucial factors for designing a cost effective thermal treatment process for TR polymer membranes. It has been widely described that the thermal behaviour of polyhydroxyimide by thermogravimetric analysis (TGA) shows two distinct weight losses. The first and wide one appears in the range of 300-500° C. corresponding to the $CO_2$ evolved in the rearrangement to PBO. The second one is due to the decomposition of the polymer backbone at around 500-600° C. Furthermore, thermogravimetric analysis coupled with mass spectroscopy (TGA-MS) provided evidence for the $CO_2$ evolution by detection of the mass weight of 44.

Refining this, Calle et al., *"The relationship between the chemical structure and thermal conversion temperatures of thermally rearranged (TR) polymers"*, Polymer 53 (2012) 2783-2791, defined three temperatures with significant changes in the first slope in the TGA curve in order to determine $T_{TR}$. Three different points ($T_{TR1}$, $T_{TR2}$ and $T_{TR3}$) were defined, namely $T_{TR1}$ as the initial temperature of the weight loss defining the temperature at which polymer chains started the cyclization process, $T_{TR2}$ as the temperature at the maximum point of weight loss or maximum amount of $CO_2$ evolution and $T_{TR3}$ as the final temperature, end of the weight loss, marking the completion of the rearrangement process.

In general, the most effective and fastest way to carry out the complete cyclization is by thermal treatment at temperatures higher than $T_{TR2}$. The temperature used for the rearrangement is influential, since an exponential increase in the conversion rate was shown with the temperature of treatment, finding the maximum increase at $T \geq T_{TR2}$.

Most research efforts and some earlier fundamental studies accordingly showed that imide-to-benzoxazole conversion requires high temperature treatments to produce PBOs with good properties. However, thermal degradation may overlap with the TR process after, especially at long treatment times, resulting in poor mechanical properties of the TR membranes.

Procedures describing attempts to reduce this rearrangement temperature have been reported, e.g. in R. Guo et al., *"Synthesis and characterization of Thermally Rearranged (TR) polymers: influence of ortho-positioned functional groups of polyimide precursors on TR process and gas transport properties"*, Journal of Materials Chemistry A, 1 (2013) 262-272. Attempts using more flexible monomers and subsequently more flexible polyimides with lower glass transition temperature (Tg) have been reported which lead to a reduction of the rearrangement temperature required for a total PBO conversion of 100° C. (from 450° C. to 350° C.). On the other hand, the flexibility of these membranes lead to a strongly detrimental effect on the final separation properties of the polymer.

Gang Yang et al, "A New Synthetic Route to Benzoxazole Polymer via Tandem Claisen Rearrangement", Marcromolecules 2001, 34, pages 6545 to 6547, discloses a synthetic route to a soluble aromatic polybenzoxazole through thermal transformation of a precursor polyamide which has isobutenyl bis(aryl ether) moieties ortho to amide nitrogen in polyamide. A Claisen rearrangement of the moieties initially led to the formation of bis(o-amidephenol) linkages, followed by the intramolecular cyclization, with loss of water, to oxazole rings in the resulting polymer.

PBX structures could be obtained also from polyamide derivates, e.g., polyhydroxyamides (PHA) for the production of PBO. It was observed for the structures derived from PHA that the temperature necessary for the thermal rearrangement to transform to the corresponding PBO is lower than for the corresponding derived from PHI. This is possibly due to the higher flexibility around the aromatic amide linkage of the hydroxyl groups in PHA compared to the tertiary amine in PHI, thus PHAs can be thermally rearranged at temperatures usually 100° C. lower than PHIs. Despite this, there is a certain detrimental effect on the separation properties as compared to those derived from PHI.

SUMMARY OF THE INVENTION

A general description of the previously outlined method of obtaining TR PBO is disclosed in EP 2 345 685 A2, the content of which is incorporated by reference in the present application in full.

It is the object of the present invention to provide a method for producing a thermally rearranged PBX and the thermally rearranged PBX as well as membranes made out of the thermally rearranged PBX that are further improved in separation properties as well as permeability, in particular when used for gas separation.

This object is solved through a method of producing a thermally rearranged polybenzoxazole, polybenzimidazole or polybenzothiazole, including the following method steps:

preparing a polyimide or aromatic polyamide as a precursor polymer in a solution, wherein in each recurring monomer unit of the precursor polymer an aromatic ring is located adjacent to the nitrogen atom of the imide group or amide group of the monomer unit, wherein in some or all of the recurring monomer units the aromatic ring is functionalized with an —XR group as a side chain at the ortho-position to the nitrogen atom, wherein X=O, N or S, and performing a thermal treatment to carry out a thermal rearrangement resulting in the thermally rearranged polybenzoxazole, polybenzimidazole or polybenzothiazole, characterized in that R is an allyl group or an allyl-based group, wherein a processing temperature used during the thermal treatment for the thermal rearrangement is between 0° C. and 350° C.

Within the scope of the present application, an allyl-based group is a group of the type —$CR_1R_2$—$CR_3$=$CR_4R_5$, wherein $R_1$ to $R_5$ each denote a hydrogen atom or a homo- or hetero-aliphatic or -aromatic structure, in particular with up to 20 Atoms. The allyl group —CH2—CH=CH2 represents the case where all of $R_1$ to $R_5$ represent a hydrogen atom. The upper limit of 20 C-Atoms includes, e.g., up three aromatic rings attached to the allyl group. Heteroatoms may be, e.g., Si or other suitable atoms. Within the scope of the invention, the homo- or heteroaliphatic or -aromatic structure may also encompass metal atoms in a covalent or a complex bond. The allyl-based group may also contain two or more double bonds between carbon atoms.

The present invention is based on the consideration that by the addition of an allyl group or an allyl-based group in the ortho-position of the aromatic ring via an O-, N- or S-atom a different kind of thermal rearrangement is achieved that takes place at lower temperatures than those used in conventional TR. The inventive chemical functionalization of a polymer is followed by thermal rearrangement in the form of a Claisen rearrangement. The polymer sustaining chemical functionalization is an ortho-functional polyimide or polyamide, which in the case of a polyimide is synthesized via chemical or thermal imidization or even from the precursor polyamic acid. The separation properties for gas/gas, liquid/gas or liquid/liquid are similar or better than those of the precursor polymer.

A part of the present invention is the reduction of the temperature necessary for the thermal rearrangement of the polymer of an ortho-functional polyimide or polyamide to PBX without reduction on the permeability properties. The temperature reduction by functionalization of the ortho-position group or the functionalization of the aromatic ring can be achieved in the range of 0° C. to 350° C. This relatively new family of polymers shows critical properties necessary to be applied for example in natural gas purification: high $CO_2$ permeability and $CO_2/CH_4$ selectivity, good chemical resistance, and good resistance to high $CO_2$ feed pressures which prevents polymers from plasticizing in the presence of $CO_2$. Due to the temperature reduction this kind of polymers could also be more attractive for industrial applications, from the economic standpoint as well as because of the avoidance of any thermal degradation.

By way of the inventive treatment the rearrangement is achieved at much lower temperatures than before. Using auxiliary techniques like conduction, convection or electromagnetic irradiation, this rearrangement can be achieved in the range from 0° C. to 350° C. This temperature depends on the amount of the available groups for functionalization of the structure of the polymer, the structure of the polymer itself, and the extent of functionalization. Even a few functionalized units (0.1% of the —OH groups) can reduce the temperature to obtain polybenzoxazole (PBO) in an effective way. This is similar in the case of polybenzothiazole (PBT) and polybenzimidazole (PBI) as well.

The functionalization process can be followed either at the synthesized polyimide or polyamide polymer, or on the corresponding diamine or dianhydride monomers conserving or improving the properties of the pristine unmodified polymers. The functionalization converts each of these kinds of compounds into candidates for the application in different separation topics. As this functionalization can be applied on the monomers and/or on the polymer, the skilled person has the potential to modify the extent of functionalization In contrast to the previously known thermal rearrangement process, during which a second group which is chemically linked through an O, N or S moiety at the ortho-functional group of the polyimide is lost while leading to the desired PBX, the allyl group or allyl-based group is not lost during the inventive rearrangement, although it changes its position on the aromatic ring.

One class of precursor polymers that may be used for the functionalization and treatment according to the present invention is disclosed in EP 2 345 685 A2. All the compounds disclosed therein as well as all combinations of components constituting precursor polyamic acids or polyimides may be functionalized and thermally rearranged at lower temperatures according to the present invention.

The polymer of this invention may be made into a membrane for gas separation. However, films or hollow filaments or fibers having a porous separation membrane, or substrate, and a coating in contact with the porous separation membrane are also within the scope of the present invention. The polymers of the present invention may be used to make a mixed matrix membrane that includes a polymer or small, discrete molecular sieving entities or particles encapsulated in the polymer wherein the mixed matrix membrane contains, for example, a metal oxide. A mixed matrix membrane may also be used in the form of a dense film, tube or hollow fiber.

A degree of functionalization is preferably between 0.1% and 100%, further preferably between 2% and 50%, further preferably between 5% and 25%. On the molecular level, the degree of functionalization is defined as the ratio of the aromatic rings in the main chain of the precursor polymer adjacent to the nitrogen atom of the imide or amide group functionalized with an —XR side chain group over all such main chain aromatic rings adjacent to the nitrogen atom of imide groups or amide groups. No functionalization at all corresponds to a degree of functionalization of 0%. In contrast, if every single one of said aromatic rings is functionalized according to the invention, the degree of functionalization is 100%. Good results have been found even with small degrees of functionalization, starting at approximately 0.1%, with best results around 10% to 20%. The optimum may depend on the polymeric system used and on process conditions. The degree of functionalization can be controlled by adjusting the stoichiometric ratio between the allyl or allyl based groups used for functionalization and the precursor monomers, taking into account the number of inventively functionalizable sites per monomer.

Advantageously the precursor polymer is a polyimide synthesized through a reaction between a dianhydride and a diamine, through a reaction between a dianhydride and a diisocyanate or through the ester-acid route with a silylation pre-treatment, in particular using solid state thermal imidization, solution thermal imidization or chemical imidization, wherein in particular 3,3'-dihydroxy-4,4'-diamino-biphenyl (HAB) is used as diamine and/or 2,2'-bis-(3,4-dicarboxyphenyl) hexafluoropropane dianhydride (6FDA) is used as dianhydride.

The most common imidization routes include solid state thermal, solution thermal and chemical imidization, and these routes were previously used in order to obtain PBO, PBI or PBT structures. Other existing synthesis routes and monomer pre-treatments include the so-called ester-acid route and a silylation pre-treatment used to increase the nucleophilicity of the diamine. These routes, as well as others not described here, offer additional methods for tuning the properties of the TR polymers for separation applications.

The functionalization with an allyl-group or an allyl-based group is performed advantageously on a monomer unit before polymerization, during polymerization or on the precursor polymer.

A functionalization agent is preferably introduced, in particular an allyl-halide, in particular allyl bromide, and in particular an activating agent, in particular $K_2CO_3$, is or are added to the solution. Other functionalization agents are equally applicable, e.g., allyl halides, such as allyl fluoride, allyl chloride or allyl iodide. The activating agent is used to remove the hydrogen atom from the —OH-group.

Advantageously an aromatic polyamide derivate, in particular a polyhydroxyamide, is used as precursor polymer, which in particular is produced through a reaction of bisA-PAF with terephthaloyl chloride. Herein, bisAPAF denotes 2,2-Bis-(4-carboxyphenyl) hexafluoropropane.

Preferably, a solid-state object, in particular a film, is produced from the solution prior to the thermal treatment and the thermal treatment resulting in the thermally rearranged polybenzoxazole, polybenzimidazole or polybenzothiazole is carried out on the solid-state object. This is most convenient for membrane applications.

The first part of the process of the Claisen rearrangement can be performed in solution or solid state before or after the corresponding rearrangement.

An object underlying the present invention is also solved through a thermally rearranged polybenzoxazole, polybenzimidazole or polybenzothiazole, containing an allyl group or allyl based group as a side chain at an aromatic ring of the heteroaromatic benzoxazole-group, benzimidazole-group or benzothiazole-group. This is in contrast to previously produced TR PBX, wherein the functional group at the ortho-position is lost during the thermal rearrangement. The inventive use of the Claisen rearrangement uses a different route of rearrangement in which the allyl group or allyl based group is preserved in the PBX. The inventive PBX is advantageously produced according to the above-described inventive method and shares its advantages.

The object of the present invention is furthermore solved through a polymeric membrane comprising an inventive thermally rearranged polybenzoxazole, polybenzimidazole or polybenzothiazole as previously described. The membrane is preferably cast or spun from the solution of the first method step of the inventive method as a flat membrane or a hollow fiber membrane. The membrane is preferably a gas separation membrane, in particular having microcavities with sizes of less than 1 nm.

The polymers may be transferred into composite membranes. Composite membranes are composed of different layers of polymers having different porosities. In the case according to the present invention, the TR polymer is the separation-active layer. As a support to this separation layer different porous membranes may be used, in particular including a gutter layer which prevents sideways movement. The thermal stability of these membranes can vary and can be controlled as a function of the composition. When the polymer is processed as a thin layer (thickness <1 µm), the rearrangement temperature can be reduced by 50° C. to 100° C. Since, in order to achieve the desired properties, heating of the system above the thermal rearrangement temperature is necessary, the support layer is preferably heat resistant, in particular in the range between 200° C. to 300° C. or more.

Further characteristics of the invention will become apparent from the description of the embodiments according to the invention together with the claims and the included drawings. Embodiments according to the invention can fulfill individual characteristics or a combination of several characteristics.

BRIEF DESCRIPTION OF THE DRAWINGS

The invention is described below, without restricting the general intent of the invention, based on exemplary embodiments, wherein reference is made expressly to the drawings with regard to the disclosure of all details according to the invention that are not explained in greater detail in the text. The drawings show.

DETAILED DESCRIPTION

Figure 1:
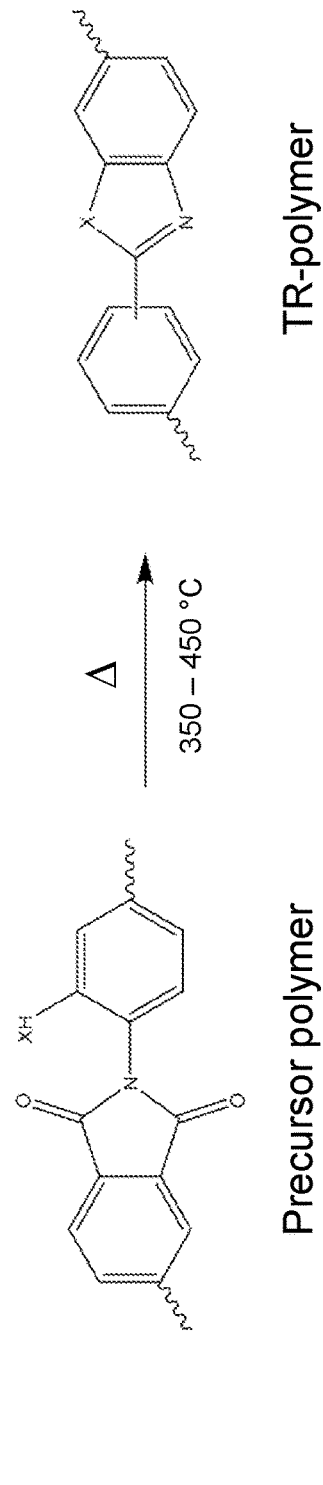
FIG. 1 a schematic representation of the production of a PBX by way of thermal rearrangement, according to the prior art, FIG. 2 a schematic representation of a known production of a TR-polymer, FIG. 3 different routes for obtaining conventional and functionalized TR PBO, FIG. 4 a schematic representation of an inventive route for the production of a TR-polymer, FIG. 5 a schematic representation of a possible inventive rearrangement process, FIG. 6 different routes for obtaining conventional and functionalized TR PBO from PHA, FIG. 7A and FIG. 7B idealized and measured TGA data on unmodified and functionalized PBO, FIG. 8 FTIR spectra of different unmodified and functionalized PBO and FIG. 9A-9D thermal characterization of unmodified and functionalized PBO, FIG. 10A-10D TGA measurements of various unmodified and functionalized PBO, FIG. 11 the synthesis of PBO derived from 6FDA-BisAPAF, FIG. 12 the synthesis of PBO derived from BTDA-BisAPAF and FIG. 13 the synthesis of PBO derived from PMDA-BisAPAF.
Figure 2:
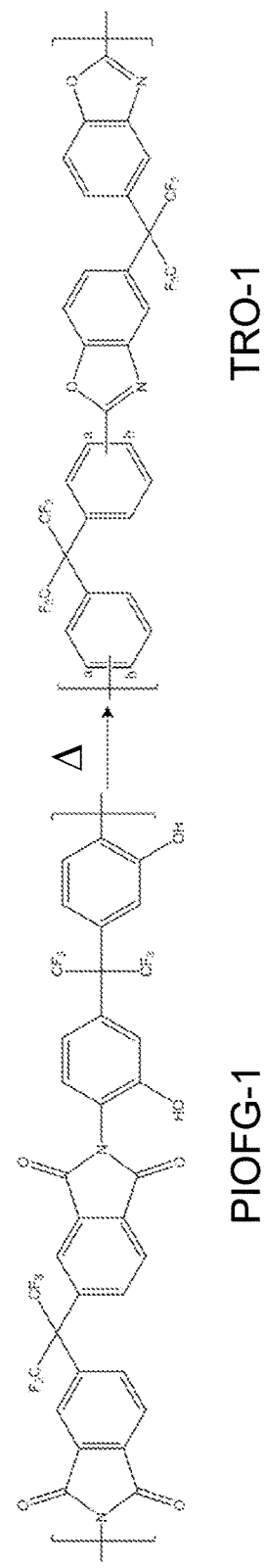
Figure 3:
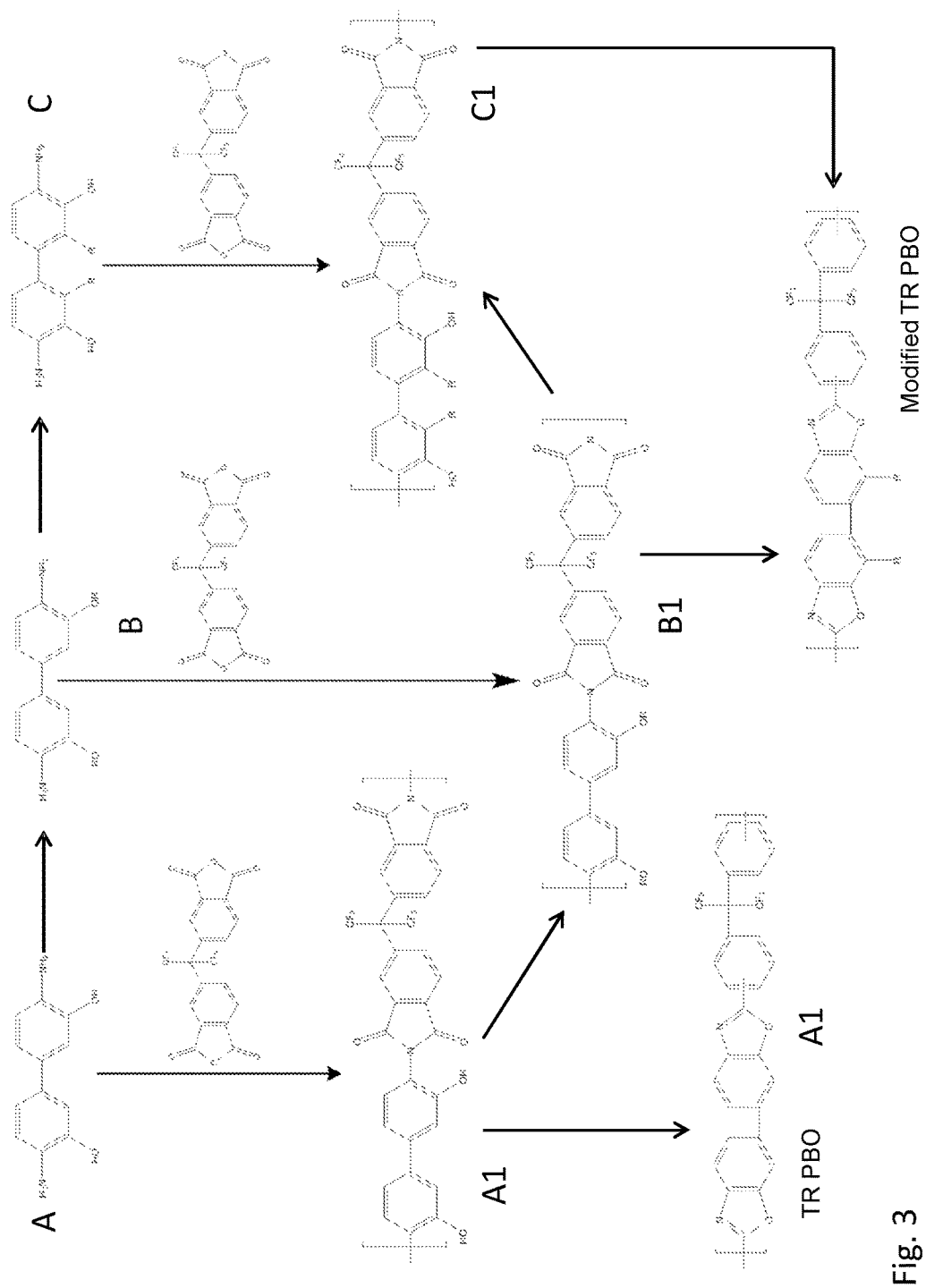

FIGS. 1 and 2 show the known path for obtaining PBX from precursor polyimides according to H. B. Park et al., *Science*, 2007, and were explained above. In FIG. 3, this known reaction corresponds to the route A-A1, arriving at the unmodified TR PBO.

The skilled person will understand that multiple routes may be used. For example, several methods are possible to prepare polyimides, among them the reaction between a dianhydride and a diamine and the reaction between a dianhydride and a diisocyanate. The substitution can take place in other positions and even multi-substitutions.

Four exemplary synthesis procedures for obtaining inventively functionalized TR PBO are shown in FIG. 3, namely according to the routes a. A-A1-B1-functionalized TR PBO,
b. A-B-B1-functionalized TR PBO,
c. A-B-B1-C1-functionalized TR PBO and
d. A-B-C-C1-functionalized TR PBO.

In each case in the exemplary embodiment of FIG. 3, the starting monomers are 3,3'-dihydroxy-4,4'-diamino-biphenyl (HAB)

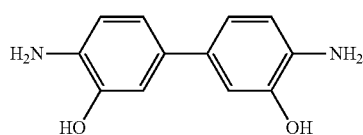

and 2,2'-bis-(3,4-dicarboxyphenyl) hexafluoropropane dianhydride (6FDA)

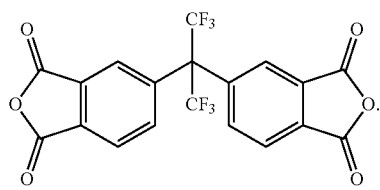 [SMILES: O=C1OC(=O)c2cc(C(c3ccc4c(c3)C(=O)OC4=O)(C(F)(F)F)C(F)(F)F)ccc21]

Figure 4:
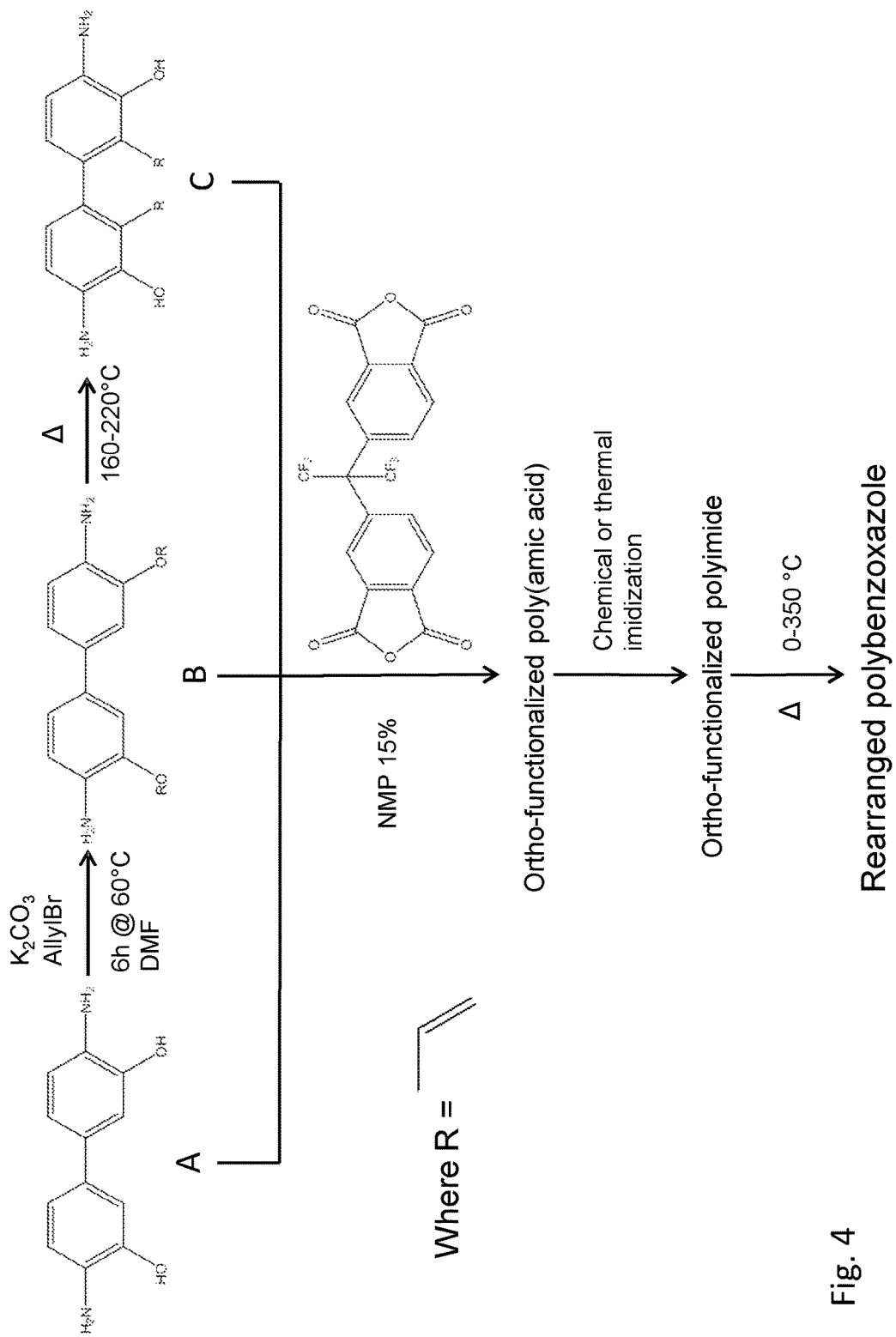

In order to obtain the functionalized polymers, shown in FIG. 4, the reaction is carried out either on the monomers (routes B and C in FIG. 4, same as routes B to D in FIG. 3) or on the polymer (route A of FIG. 3, same as route A of FIG. 4).

The thermal rearrangement temperature for the PBX production may be lowered even if the Claisen rearrangement has already taken place and the moiety facing the imide group is —XH (X being O, N or S), as in compound C1 of FIG. 3 or route C of FIG. 4. There are two possible reasons for this. The first idea is that the oxygen is already activated (like O—) and then it is easy to start the process. The second possibility is that when the allyl chain moves to the aromatic ring, the flexibility of the polymers changes. It is then more flexible so that the glass transition temperature Tg of the polymer is lower. In that case, the thermal rearrangement process occurs at lower temperatures. Thereby the rearrangement occurs at lower temperatures while the separation properties of the materials are kept, since the main chain of the polymer is not or hardly changed. In addition, the amount of modification needed is low.

As an example, the reaction described in FIGS. 3 and 4 uses allyl-bromide (AllylBr) as functionalization agent. Furthermore, an activating agent, for example $K_2CO_3$ is added, and the temperature is raised to 60° C. Then, the corresponding amount of the allyl-derivate is added, and the reactions are left to complete for 24 hours, resulting in an ortho-functionalized poly(amic acid). Chemical or thermal imidization leads to ortho-functionalized polyimide which then is thermally rearranged to PBO.

Figure 5:
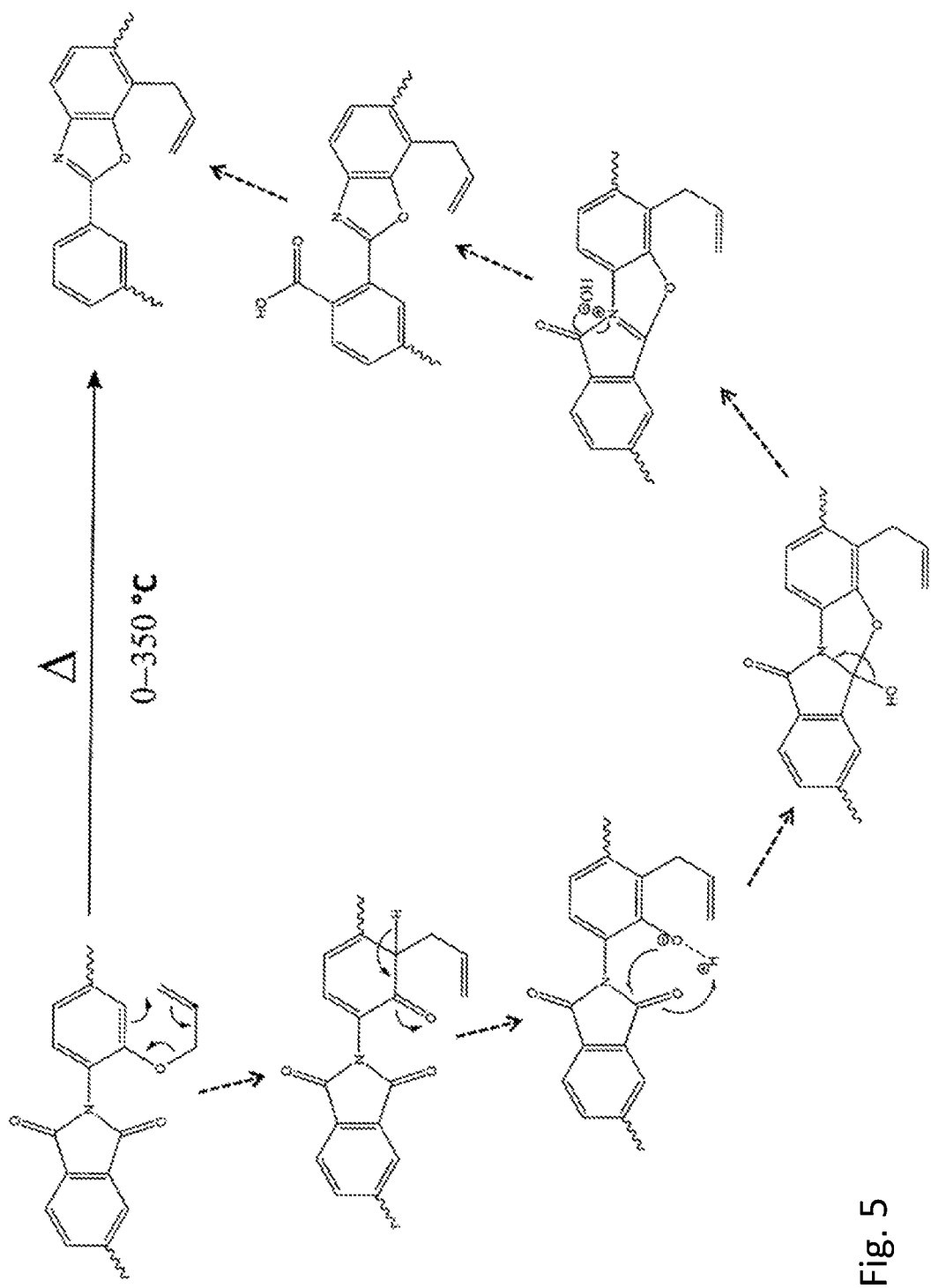

The steps of the Claisen rearrangement of the allyl group in the case of an aromatic polyimide monomer unit functionalized according to the present invention are shown in FIG. 5. In the beginning, the oxygen and allyl group form an open ring with the phenyl ring which is prone to electron hopping, affording the oxygen atom with a double electron binding to the aromatic ring, whereas the allyl group is bound to the next carbon atom of the aromatic ring. The following steps complete the rearrangement in the course of which the two oxygen atoms of the imide group are lost and a heterocycle oxazole ring is formed on the homocyclic aromatic ring. Here, the allyl group serves as a catalyst for the formation of the benzoxazole unit.

Figure 6:
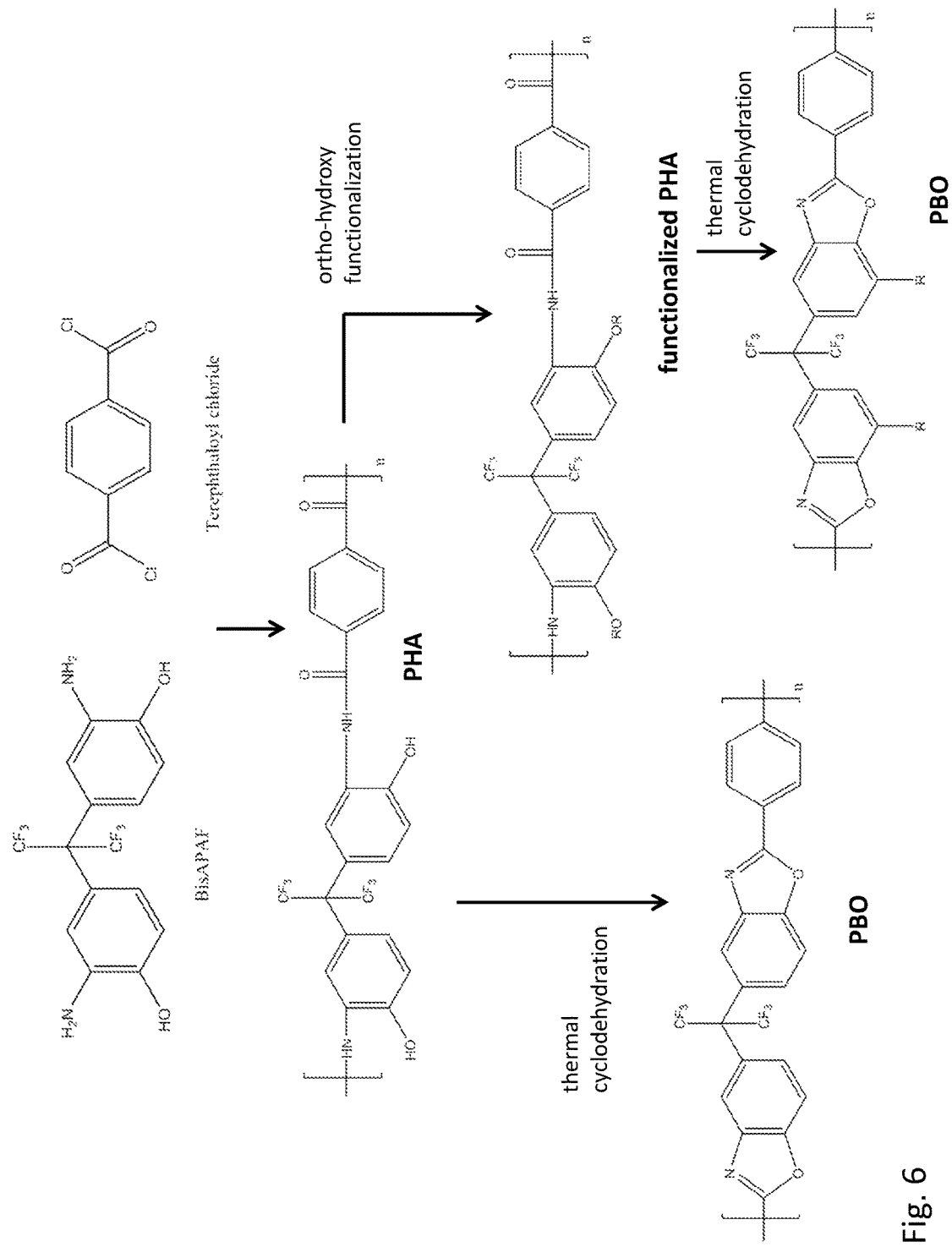

FIG. 6 shows an alternative route, starting from 2,2-Bis (3-amino-4-hydroxyphenyl)-hexafluoropropane (bisAPAF) and terephthaloyl chloride monomers. In this case, it is the —OH-moieties of bisAPAF that are functionalized with allyl groups. Thermal cyclodehydration of the functionalized polyhydroxyamide (PHA) leads to the creation of the functionalized PBO, with allyl groups present at the homocyclic rings of the benzoxazole units.

Figure 7A:
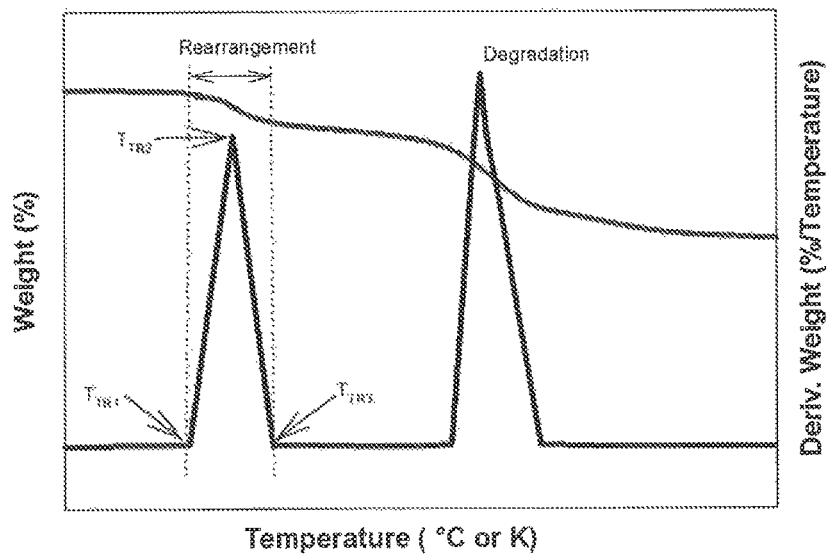

FIG. 7A shows an idealized version of a TGA (thermogravimetric analysis) scan of a polymer that is thermally rearranged and degraded in two different temperature ranges. This is described in the above-mentioned Calle et al., Polymer 53 (2012) reference, where three temperatures with significant changes in the first slope in the TGA curve are defined. $T_{TR1}$ is the initial temperature of the weight loss defining the temperature at which polymer chains start the cyclization process. $T_{TR2}$ is the temperature at the maximum point of weight loss or maximum amount of $CO_2$ evolution and $T_{TR3}$ is the final temperature, end of the weight loss, marking the completion of the rearrangement process. The degradation starts quantitatively at even higher temperatures.

COMPARISON EXAMPLE 1

An example of this procedure is described below. A polyhydroxyimide (PHI) of the general structure

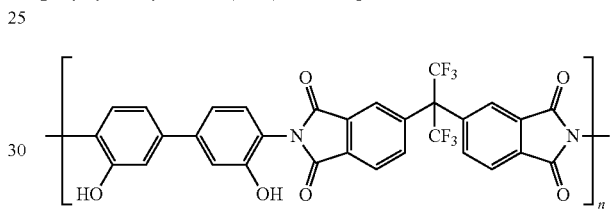

was prepared by a precursor polyamic acid of the general structure

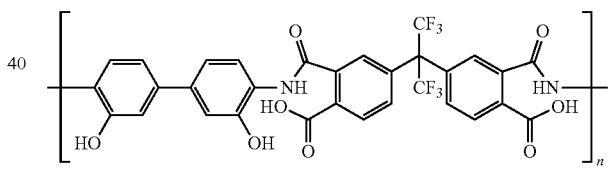

formed from the reaction of the previously shown monomers 3,3'-dihydroxy-4,4'-diamino-biphenyl (HAB) and 2,2'-bis-(3,4-dicarboxyphenyl) hexafluoropropane dianhydride (6FDA).

HAB and dry N-methyl-2-pyrrolidone (NMP) (15 wt %) were added to a flame-dried 3-neck flask equipped with a mechanical stirrer, a 2-purge, and a condenser. The HAB was dissolved in the NMP solvent, and the resulting solution cooled to 0° C. Then an equimolar amount of a representative dianhydride-6FDA, and solvent was added, giving a 15% (w/v) mixture. The mixture was stirred and gradually heated to room temperature, forming a poly(amic acid).

The imidization route followed in this case was the solution thermal imidization. To achieve this, a co-solvent was added to the reaction solution (ortho-xylene) and the temperature of the solution raised to 180° C. for 6 hours to complete the imidization. Once the polymer was imidized completely, the polyimide was precipitated in water. The solid was washed three times in methanol/water solutions, recovered by vacuum, filtered, washed with methanol and dried under vacuum at 160° C. for 24 hours.

The obtained pristine polymer was named 6FDA-pHAB or 6FDA-HAB.

EXAMPLE 1

In this example, allyl-bromide was used as functionalization agent. The reaction conditions were similar to those of Comparison Example 1 in all cases. Once the monomer or polymer was dissolved in dimethylformamide (DMF), an activating agent, for example $K_2CO_3$, was added and the temperature raised to 60° C. Then, the corresponding amount of the allyl-derivate was added and the reactions were left to complete for 24 hours. The process was followed by thin layer chromatography (TLC).

After the reaction was completed, the reaction solution was cooled down to room temperature and then precipitated in water. The solid was washed at least 3 times in methanol/water solutions, vacuum filtered, washed with methanol and dried under vacuum at 160° C. for 24 hours. The nomenclature used herein for the precursor polymer thus obtained is 6FDA-HAB-allyl, the general monomer unit structure of which is

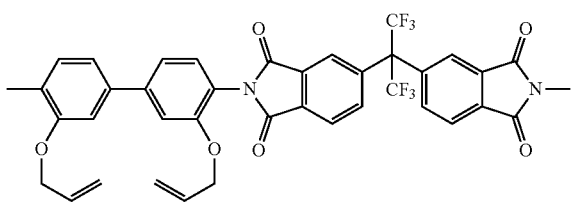

The examples were prepared following route A of FIG. 4, wherein the polymer was functionalized as was explained previously. After the functionalization reaction, the polymer was dissolved in N,N-dimethylacetamide (DMAc) and cast as a film for testing and different thermal treatment purposes.

In a series of experiments, different samples of the obtained film were in turn heated up to 160° C. to eliminate the main part of the solvents from the membranes (6FDA-pHAB-allyl-160 C);

200° C., 12 hours under vacuum to activate the Claisen rearrangement and to begin the rearrangement in at least some groups in the polymer (6FDA-pHAB-allyl-200 C);

250, 12 hours under vacuum (6FDA-pHAB-allyl-250 C);

251 275° C., 1 hour in a furnace under Argon flux (6FDA-pHAB-allyl-275 C);

300, 1 hour in a furnace under Argon flux (6FDA-6FpDA-allyl-300 C);

301 325° C., 0.5 hours in a furnace under Argon flux (6FDA-pHAB-allyl-325 C); and 350° C., 5 minutes in a furnace under Argon flux (6FDA-pHAB-allyl-350 C).

Outlay of Experimental Testing of Example 1

The inventive samples were tested in two different ways. A well-known system was selected (6FDA-pHAB) and the results compared with those found in references in the literature, a. o. those published in D. F. Sanders et al., "*Gas permeability, diffusivity, and free volume of thermally rearranged polymers based on 3,3'-dihydroxy-4,4'-diamino-biphenyl (HAB) and 2,2'-bis-(3,4-dicarboxyphenyl) hexafluoropropane dianhydride (6FDA)*", Journal of Membrane Science 409 (2012) 232-241, representing the pristine, i.e., unmodified, polymer used in Example 1 of the present application.

At first, the polymer structure and physical behaviour was characterized. The structural characterization was conducted with the techniques of nuclear magnetic resonance ($^1$H-NMR, $^{13}$C-NMR) and spectroscopy (FT-IR). By NMR the formation of functionalization in the samples was confirmed. The structures with and without functionalization were compared using FTIR, and it was possible to determine the degree of functionalization in the same way that it was described in previous works. The amount of the conversion was determined by following the peaks at 1255 cm$^{-1}$ (C—F bonds that are thermally stable and do not change during the thermal treatments), 1778 cm$^{-1}$ (C=O stretching in imide I), 1720 cm$^{-1}$ (asymmetric C=O stretching, imide I) and 1380 cm$^{-1}$ (C—N—C stretching, imide II). Following a formula mentioned by the group of Professor Freeman in US 2012/0305484 A1 it was possible to determine the amount of conversion. The imide I and imide II are two different vibrational modes in the imide group.

Physico-chemical properties were studied by differential scanning calorimetry (DSC) experiments, and extensively thermogravimetric analysis (TGA). By analysing the DSC results the glass transition temperature (Tg) of the polymers treated at different temperatures was determined. This technique was not considered crucial for the determination, but was used complementary.

By TGA, the thermal stability was determined along with the effect of different thermal treatments followed by the determination of degree of rearrangement for the samples treated at different temperatures (160, 200, 250, 275, 300, 325, and 350° C.).

Three different experimental protocols were followed. The first one was the analysis of the thermal stability of the samples. In this case, the rearrangement temperature for the unmodified and functionalized polymers was determined. The difference between the pristine polymer and the functionalized samples was significant. For the unmodified samples the process begins at temperatures around 350° C., and the maximum weight lost can be found at temperatures around 450° C., while for the functionalized samples the process starts at temperatures around 200° C. and the maximum weight loss was around 340° C. In both cases the resulting PBO starts degradation above 500° C.

The second one was the isothermal treatment for different temperatures in order to fully understand the mechanism the rearrangement followed and calculate the degree of conversion. The time of treatment was constant.

The last experiment was the analysis of the thermal stability of the samples after the corresponding thermal treatments. In this case, it was possible to determine the amount of polyimide remaining in the polymers by following the weight loss.

The second way to characterise the samples was by analyzing the separation properties of the samples. The results obtained at different temperatures and for degree of conversion to PBOs were compared with the ones of previous works found in the literature.

Results for Example 1

FTIR and TGA for all the samples were measured in order to determine the degree of conversion of the aromatic polyimide to PBO.

Figure 7B:
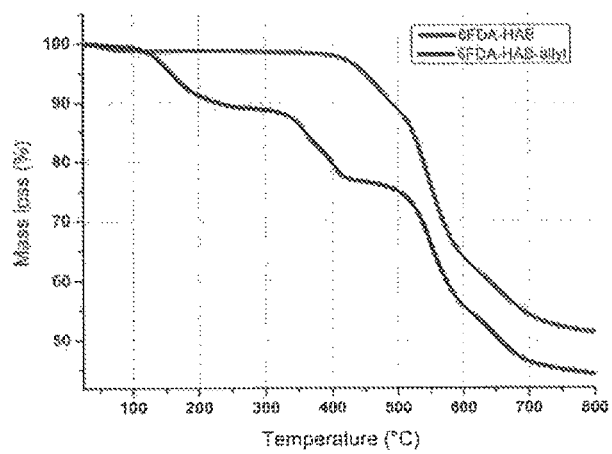

In FIG. 7B, the rearrangement temperatures for the unmodified and functionalized polymers are presented. For the samples treated at 160° C. there was some solvent remaining as the solvent (DMAc) has a boiling point of 165° C., causing the first knee in the curve. Beyond 200° C. effectively all DMAc is evaporated.

The further differences between the unmodified and functionalized samples are very clear. For the unmodified or pristine sample (6FDA-HAB) the rearrangement process begins at 350° C. and the maximum weight loss is around 450° C., overlapping with the degradation which starts even below 500° C. For the functionalized samples (6FDA-HAB-allyl) the rearrangement starts shortly over 200° C. and finishes at 340° C. The steepest slope is observed around 360° C. for the functionalized polymer and at 450 to 460° C. in the pristine polymer. The thermal stability of the resulting PBO remained similar in both cases; the main degradation temperature could be found above 500° C. in both cases.

Figure 8:
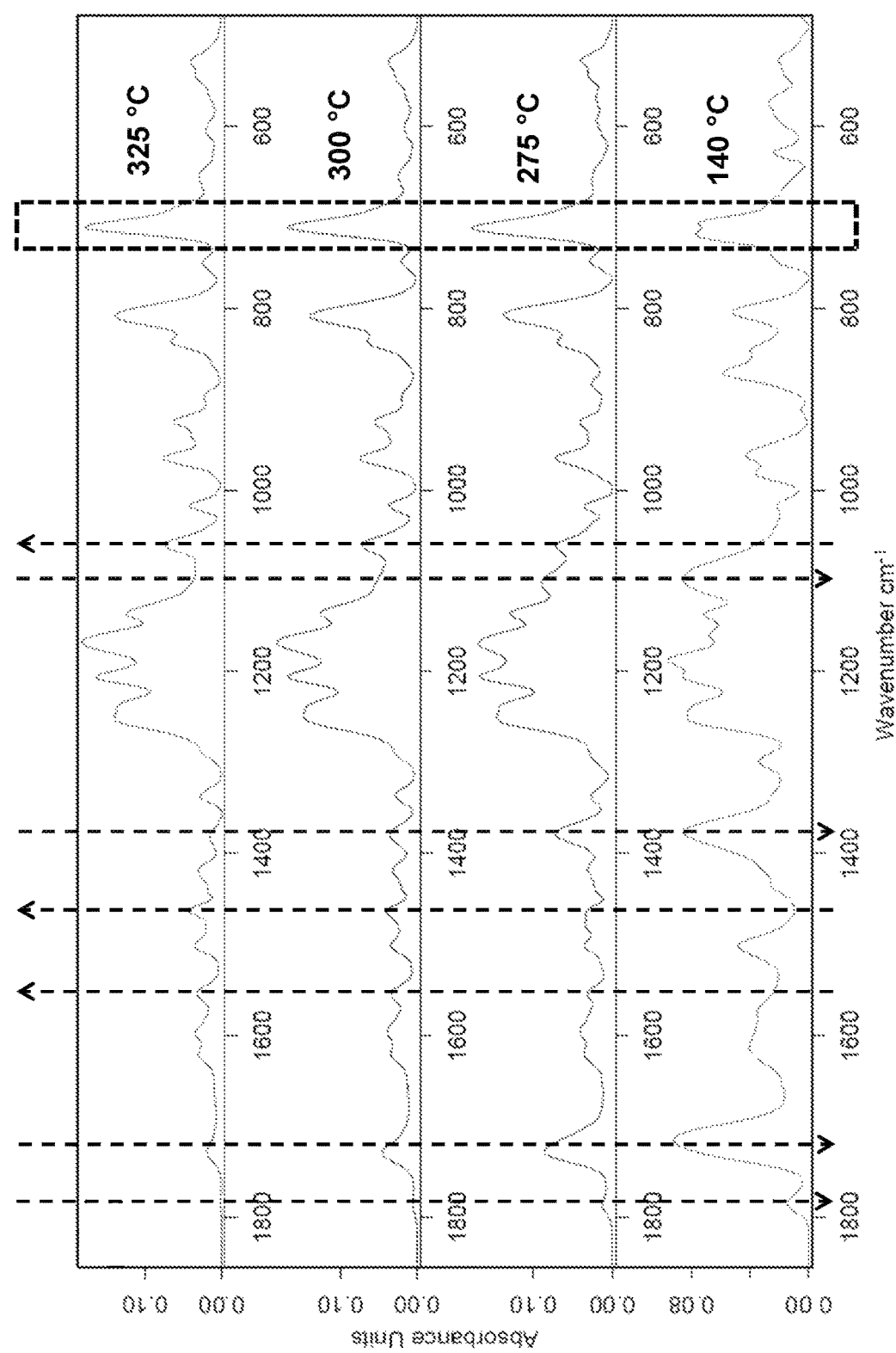

FIG. 8 depicts the FTIR spectra for samples treated at different temperatures. It was possible to determine the amount of the conversion by following the peaks at 1255 cm$^{-1}$ for normalization (C—F bonds that are thermally stable and do not change during the thermal treatments), 1778 cm$^{-1}$ (C=O stretching in imide I), 1720 cm$^{-1}$ (asymmetric C=O stretching in imide I) and 1380 cm$^{-1}$ (C—N—C stretching in imide II). These bands decrease with temperature according to the progressing conversion of the imide to benzoxazole units. The further bands that are observed and marked up are other typical vibrational modes occurring in the polymer which strengthen or disappear with progressing functionalization.

From these measurements, it was possible to determine the extent of conversion (rearrangement) following a formula put forward in US 2012/0305484 A1, the entire content is incorporated herein by reference. For this, the observed weight loss is compared with a theoretically calculated weight loss representing 100% conversion. Furthermore, all monomers and polymers are suitable for allyl-functionalization according to the present invention, under the premise that R mentioned therein is replaced by an allyl group or an allyl based group.

FIGS. 9A to 9D illustrate the results for the TGA experiments. Different experimental protocols for TGA were carried out. The first one was the analysis of the thermal stability of the samples, i.e., the residual mass of the polymer was measured as a function of time at various fixed temperatures (isotherms).

Figure 9A:
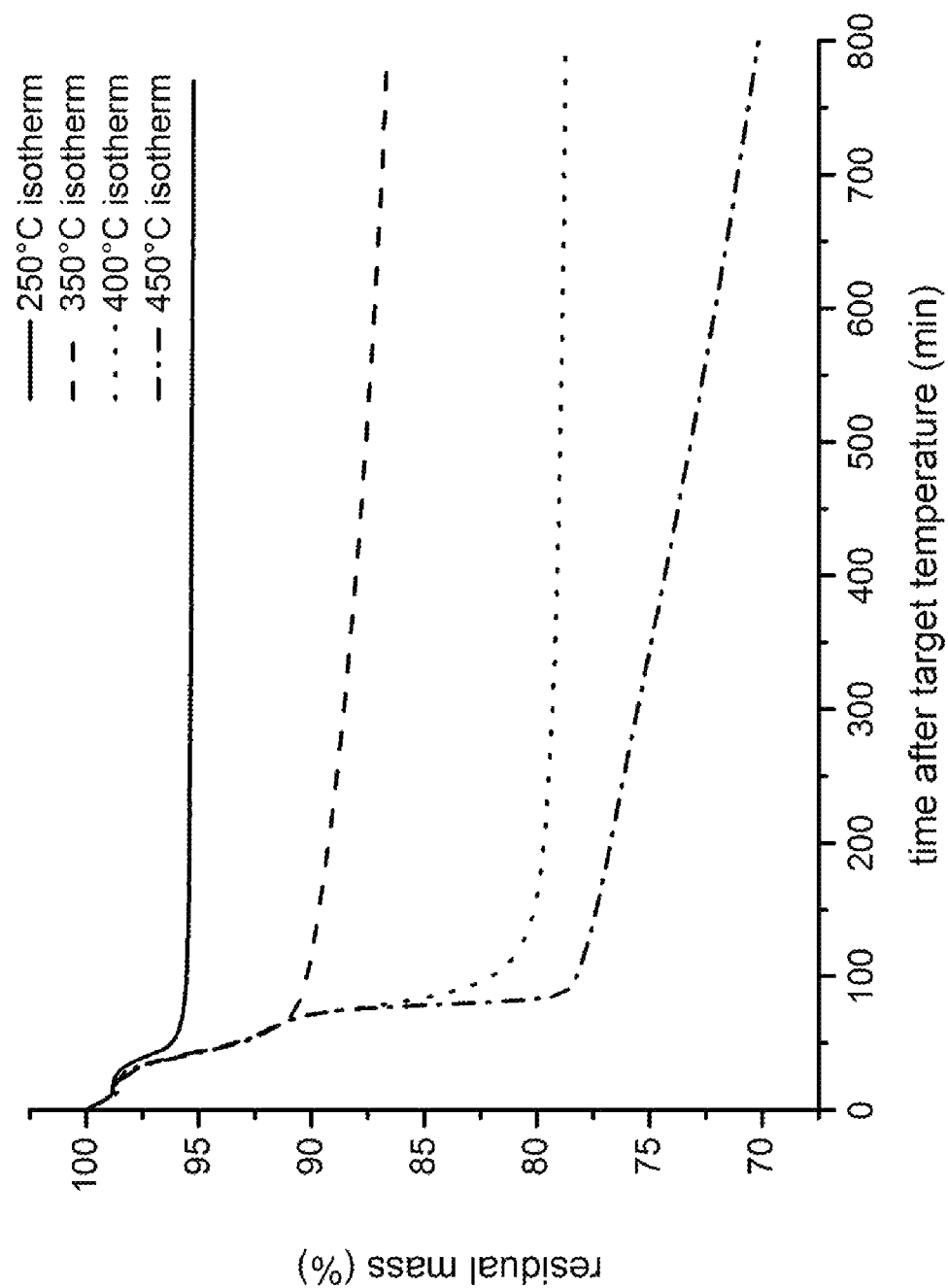
Figure 9B:
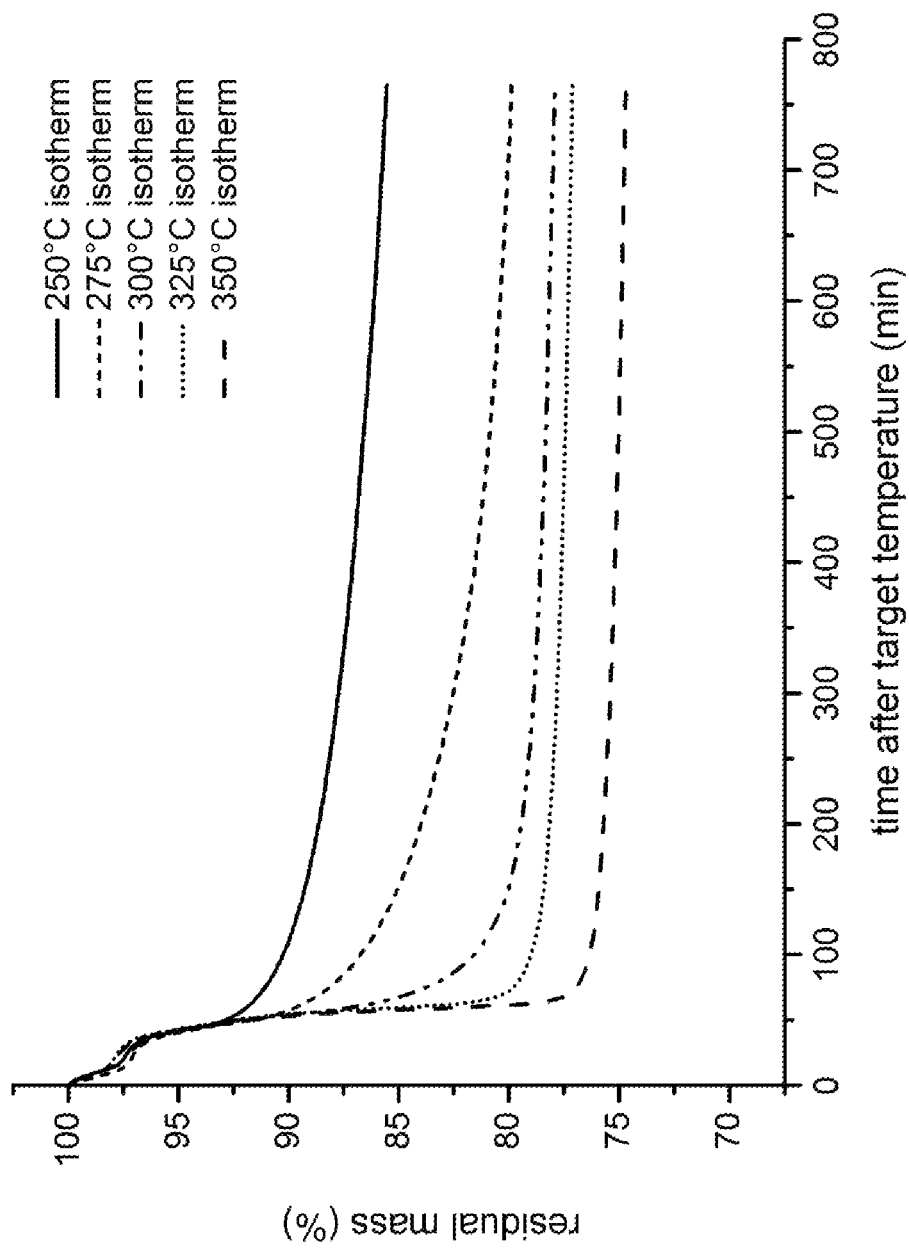

A first set of TGA measurements is presented in FIGS. 9A and 9B for the pristine polymer (FIG. 9A) and the functionalized polymer (FIG. 9B). These figures show the weight loss as a function of the time at one specific temperature. These isotherms were measured at different temperatures in order to follow the rearrangement process and calculate the degree of conversion. The isotherms were carried out at different temperatures for a constant period of time of more than 13 hours (800 minutes).

During the process, the pristine polymer is expected to suffer a loss of 14.096% of weight until completing a full rearrangement, i.e., changing from polyimide to PBO. The functionalized polymer is expected to lose 13.246% of weight. In this way it is possible to estimate the percentage of rearrangement for each thermal treatment by subtracting the measured percentage of weight loss from the initial weight. It is also possible to identify completion of the conversion when 100% conversion is reached.

In FIGS. 9A and 9B, the order of the curves is the same as in the inlays. The first step in all curves corresponds to the reimidization of the polymers and the weight loss is similar for all the samples (close to 4%). The beginning of the curves shows a loss of weight that is due to other factors, so this is taken into account by adding this initial percentage of lost weight (2-3% due to solvents a.o.) to the total. In FIG. 9A, for the pristine polymer, and FIG. 9B, for the functionalized polymer, the weight loss for the samples can be compared. It is observed, e.g., that at the 350° C. isotherm the pristine polymer has the same weight loss as the functionalized polymer at 250° C., indicating that the functionalized polymer rearranged at much lower temperatures. This is the similar for the other isotherms. The effect is especially important for the last temperatures, 450 and 350° C., respectively. In the 450° C. isotherm of the pristine polymer, a rapid decrease in the weight due to the degradation in the polymer is observed, while for the functionalized polymer the same weight loss is achieved at lower temperature and the degradation process does not occur. This stability in the 350° C. isotherm of the functionalized polymer after less than two hours indicates higher stability and less amount of oxidation.

From these curves, the degree of conversion from polyimide to polybenzoxazole may be analyzed. It is possible to calculate the theoretical one and then estimate the real one. It was shown that for the functionalized polymer, 350° C. for the complete conversion while for the pristine polymer 450° C. are needed.

Figure 9C:
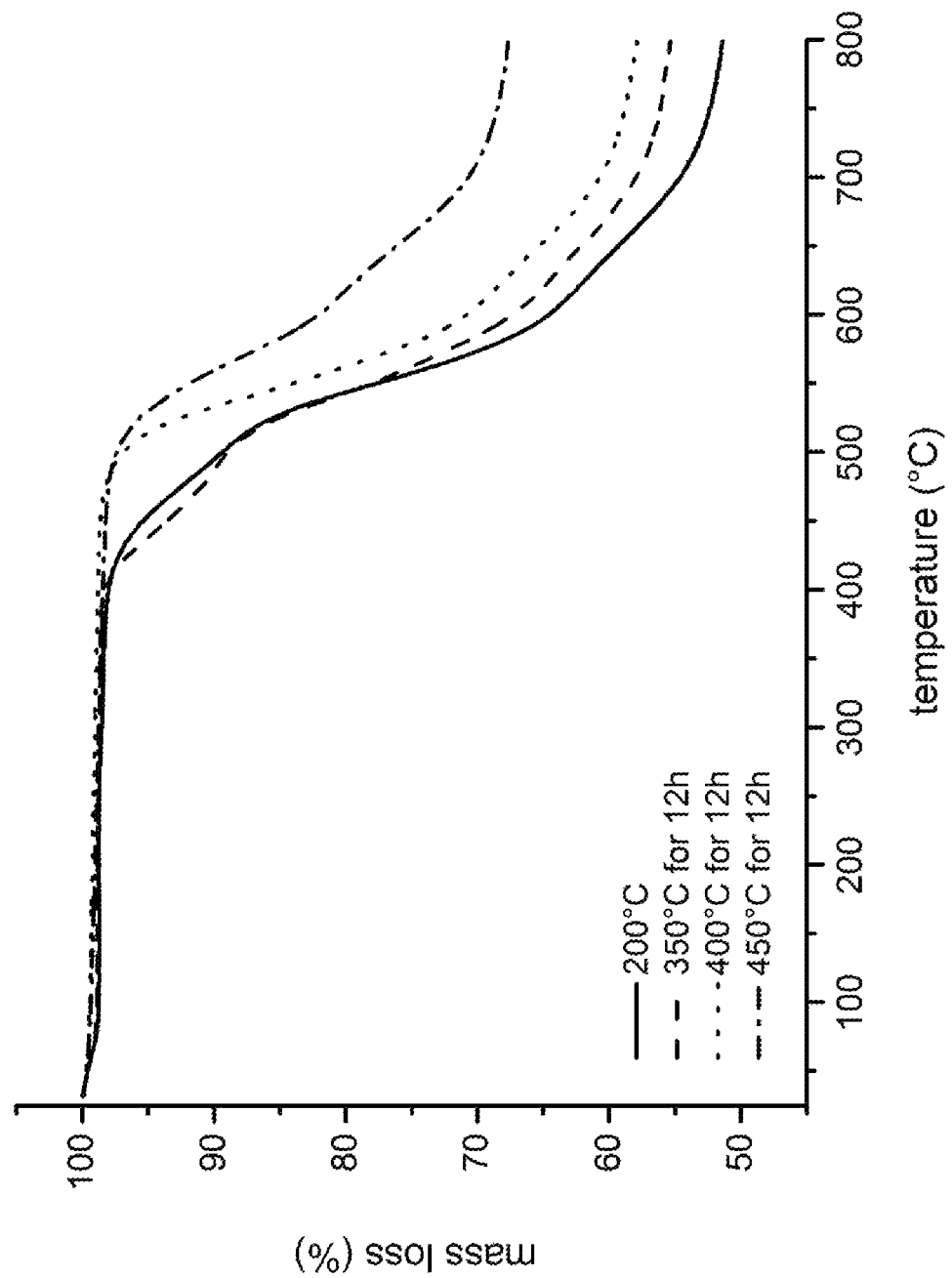
Figure 9D:
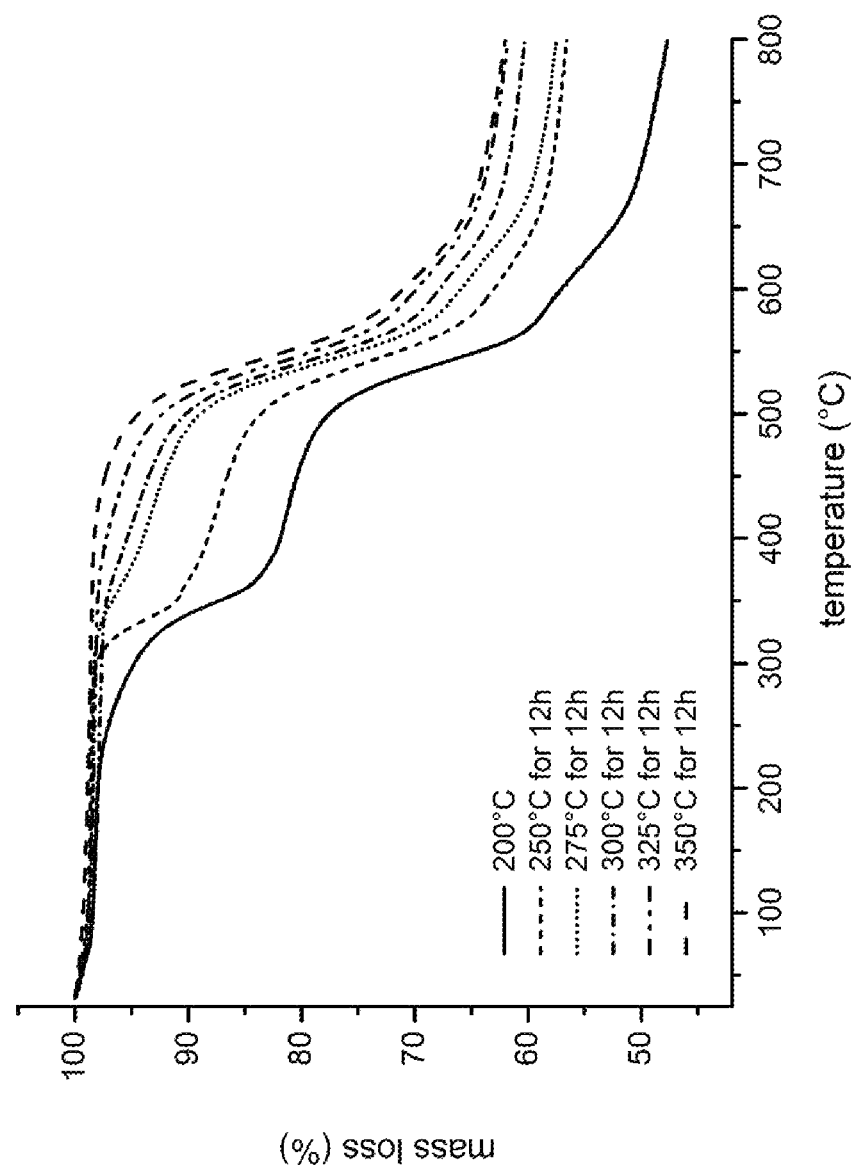

Results of a second type of measurements are present in FIGS. 9C and 9d). After producing the isothermals of FIGS. 9A and 9B, a normal thermogravimetric characterization, namely TGA measurements with temperature ramp-up were performed on the same samples that were isothermally treated for 12 hours at different temperatures. The results are shown for the pristine polymer in FIG. 9C and for the functionalized polymer in FIG. 9D. Herein, the order of the curves is inverse to that in the inlays, i.e, the highest isotherm temperatures correspond to the uppermost curves. Those curves that are designated "no thermal treatment" underwent the 160° C. pretreatment regime.

The TGA curves in FIGS. 9C and 9D range from room temperature to 800° C. for the samples treated with different temperature protocols to different functionalization extents. As can be discerned from FIG. 9D, those functionalized samples that underwent isotherm pretreatment at elevated temperatures are stable up to the degradation temperature. Others that were pretreated at 250° C. or 275° C. experience some residual rearrangement under loss of $CO_2$. In this case, it was also possible to determine the amount of polyimide remaining in the polymers by following the weight loss.

The curves of FIG. 9C show that only those samples that were pretreated at at least 400° C. are thermally stable up to degradation temperature, whereas those that were pretreated at 350° C. or lower exhibit the mass loss due to rearrangement above 400° C. It is clearly visible that the rearrangement temperatures differ from FIG. 9C (pristine polymer) to FIG. 9D (allyl-functionalized polymer) by between 50° C. and 100° C.

In a comparison between the theoretical weight loss for the thermal rearrangement and the weight loss that was found, the degree of conversion can be estimated. In this context, the deviation from the first part of the isotherm in FIGS. 9A and 9B can be eliminated. It is observed that no more weight loss was found for the functionalized sample treated at 350° C., since the conversion was already completed. Another important finding is that, although the temperature for the rearrangement is lower, the thermal stability is the same. After the conversion, both samples (pristine and functionalized) start to degrade at temperatures above 500° C.

Comparing the obtained results with the results from the existing bibliography, it is possible to observe that with the inventive functionalization similar conversion degrees can be obtained at temperatures between 100° C. and 200° C.

lower. E.g., for the functionalized sample treated at 350° C., the degree of conversion was higher than 90%, while for the pristine polymer at the same thermal treatment, the conversion was 11%. A similar degree of conversion was only obtained when the pristine polymer was thermally treated at 450° C.

Even a small amount of modification with functional units can result in the reduction of the rearrangement temperature. This behaviour indicates that the Claisen rearrangement occurring between the allyl attached to the —O in ortho-position and the aromatic ring works catalytically for the system rearrangement. Recent experiments eliminate the possibility of the rearrangement occurring via an intermolecular reaction mechanism and are consistent with an intramolecular process denominated [3,3]-electrocyclic reaction. This mechanism produces an activation of the oxygen in ortho-position so that the rearrangement of the polyimide to polybenzoxazole occurs at lower temperatures.

The required temperatures are affected by the structure of the polymers, solvent and degree of functionalization, among other factors. The formation of a double bond attached to the aromatic ring after the Claisen rearrangement probably also favours the process. This functional group may be able to delocalize the charge around the aromatic ring, thereby possibly reducing the rearrangement temperature.

The behaviour was confirmed by checking permeability properties of the functionalized samples. Table 1 shows the results for the permeability of the samples. It is simple to observe that at lower temperatures, separation properties are similar than for the samples in the bibliography, e.g., those published in D. F. Sanders et al., "*Gas permeability, diffusivity, and free volume of thermally rearranged polymers based on 3,3'-dihydroxy-4,4'-diamino-biphenyl (HAB) and 2,2'-bis-(3,4-dicarboxyphenyl) hexafluoropropane dianhydride (6FDA)*", Journal of Membrane Science 409 (2012) 232-241, representing the pristine, i.e., unmodified, polymer used in the first example of the present application. In fact, similar permeabilities and higher selectivities were found.

The D. F. Sanders reference results for the PHI 6FDA-HAB precursor polymer are abbreviated by "FG" ("Freeman's group") in the following, followed by the treatment temperature used to initiate the thermal rearrangement. The results for the inventively functionalized precursor polmyer 6FDA-HAB-allyl are named "Modified PHI", followed by the pretreatment temperature.

TABLE 1

| Sample | Permeability (Barrer) | | | Selectivity (dimensionless) | |
| --- | --- | --- | --- | --- | --- |
| | $H_2$ | $O_2$ | $CO_2$ | $O_2/N_2$ | $CO_2/CH_4$ |
| FG (300° C.) | 11 | 0.64 | 2.9 | 6.4 | 48.3 |
| FG (350° C.) | 55 | 3.9 | 17 | 6.3 | 65.4 |
| FG (400° C.) | 115 | 13 | 58 | 4.8 | 38.7 |
| FG (450° C.) | 155 | 21 | 95 | 4.7 | 31.4 |
| Modified PHI (200° C.) | 47 | 3.48 | 15 | 7.0 | 48.9 |
| Modified PHI (250° C.) | 41 | 3.2 | 13.9 | 5.9 | 47.0 |
| Modified PHI (350° C.) | 130 | 18 | 83 | 5.6 | 35.8 |

A very important effect has to be taken in account: this reduction on the rearrangement temperatures produces at the same time samples with wonderful separation properties and excellent mechanical properties. This effect could be observed in the samples, and explained by TGA. As it was shown, the rearrangement finishes at temperature much lower than degradation temperatures. In this way, the degradation process is not initiated, and the samples are stable, living up to their full capacity.

The inventive method to obtain low temperature rearrangement from ortho-functional polyimide can be applied to all the structures precursor of thermally rearrangement polymers, understanding by this, all kinds of structure capable of reorganizing (as much in solid and in solution).

FURTHER EXAMPLES

FIGS. 10A to 10D show TGA measurements for four different pristine and functionalized polybenzoxazoles, of which the functionalized version in each case is an example according to the present invention.

Figure 10A:
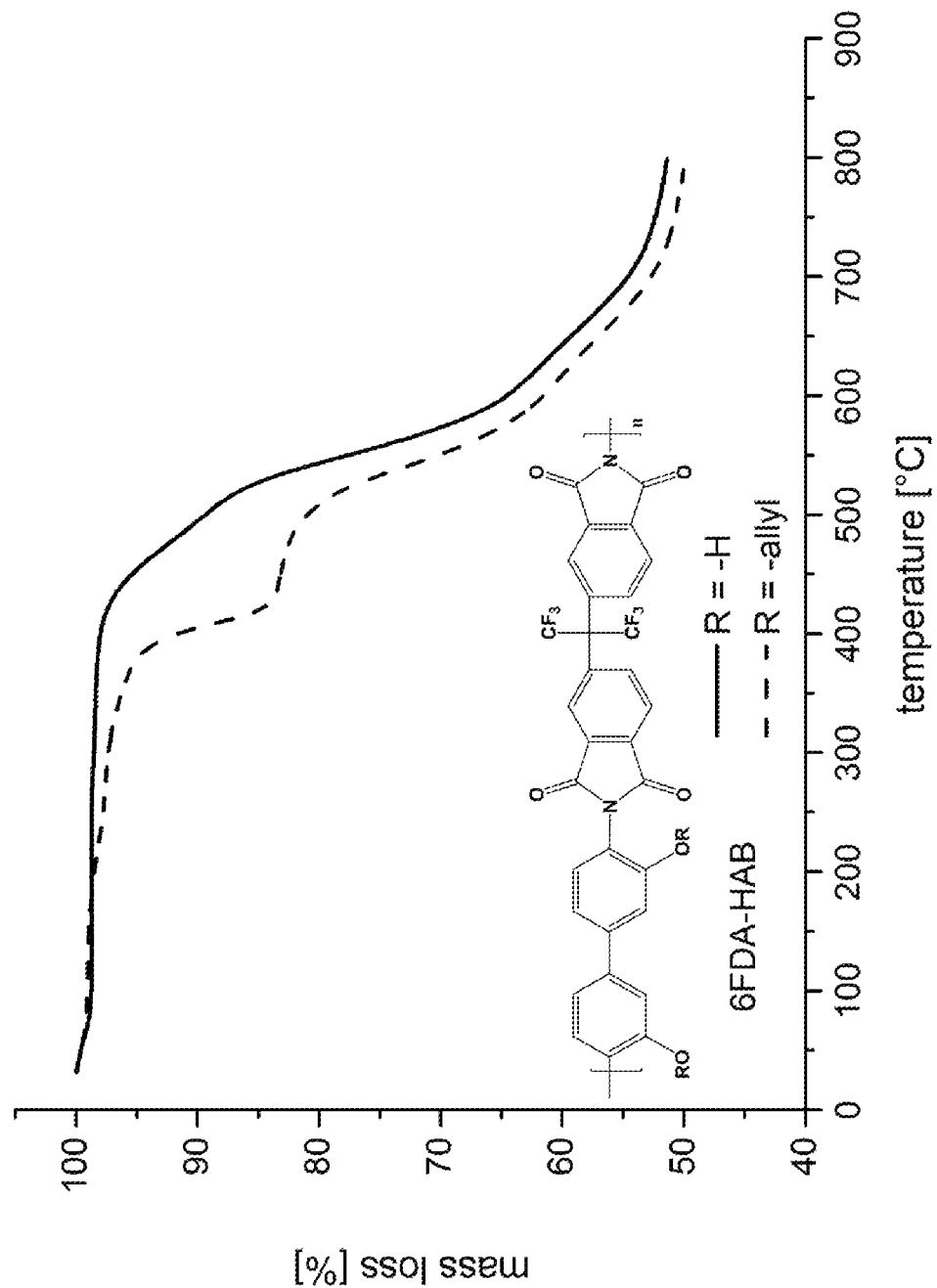

FIG. 10A shows a TGA temperature scan for pristine and functionalized PBO derived from 6FDA-HAB after thermal treatment at 350° C. for 12 hours, as described in Example 1 above. This precursor corresponds to precursor compound A1 in FIG. 3, whereas the pristine PBO corresponds to final compound A1 in FIG. 3 and the functionalized PBO to the "Modified TR PBO" derived from B1 in FIG. 3.

Low-level thermal rearrangement can be observed in the functionalized PHI at a temperature as low as ca. 200° C., picking up pace at higher temperatures. Thermal rearrangement is finished at slightly above 400° C. Thermal degradation does not set in until ca. 500° C. The temperature ranges of thermal rearrangement and thermal degradation have no significant overlap in this case.

In contrast, the curve for the pristine PHI only bends down above ca. 430° C., directly connecting to the even steeper slope of thermal degradation. The temperature ranges of thermal rearrangement and thermal degradation overlap significantly in this case.

EXAMPLE 2

Figure 10B:
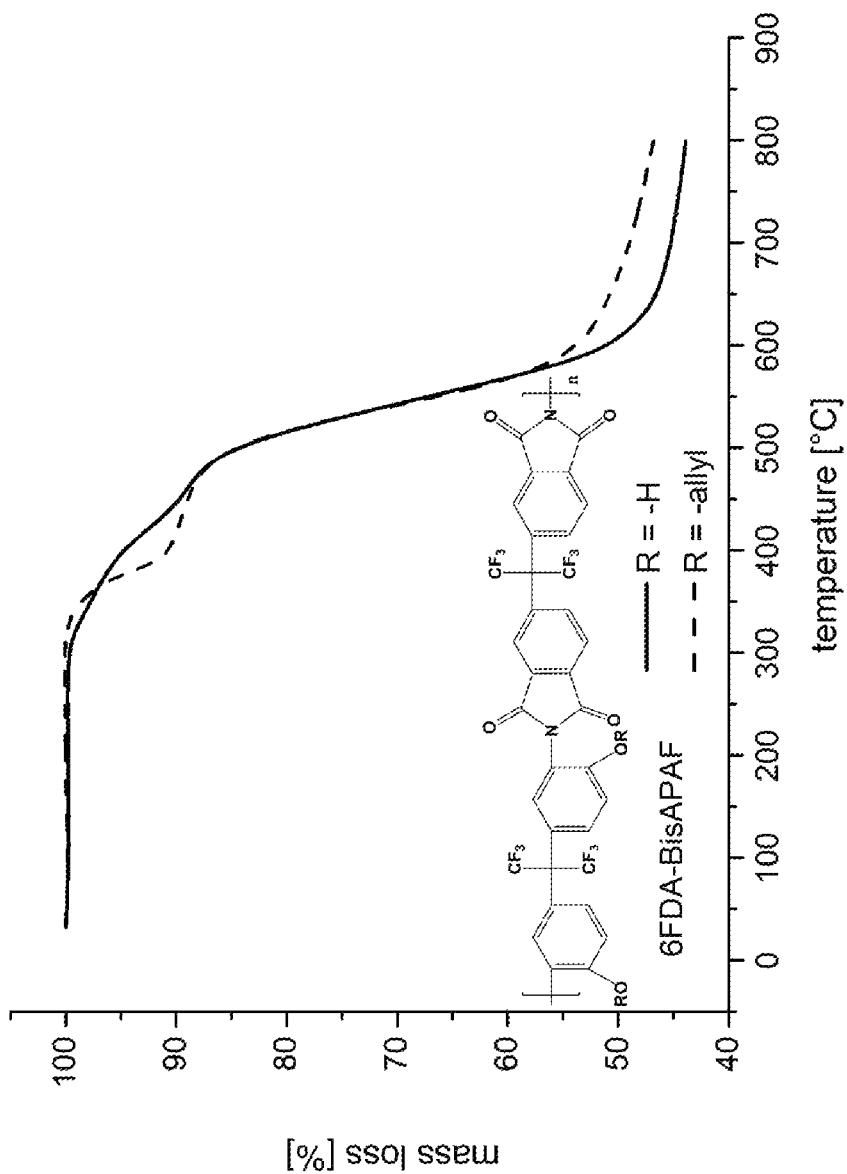

FIG. 10B shows TGA temperature scan results for a pristine and a functionalized precursor PHI which were obtained according to the method described above in Example 1 and Comparison Example 1, but with 2,2-Bis(3-amino-4-hydroxyphenyl)-hexafluoropropane (BisAPAF) instead of HAB. All other reaction parameters were kept the same. The poly(hydroxyimide) precursor is called 6FDA-BisAPAF.

Figure 11:
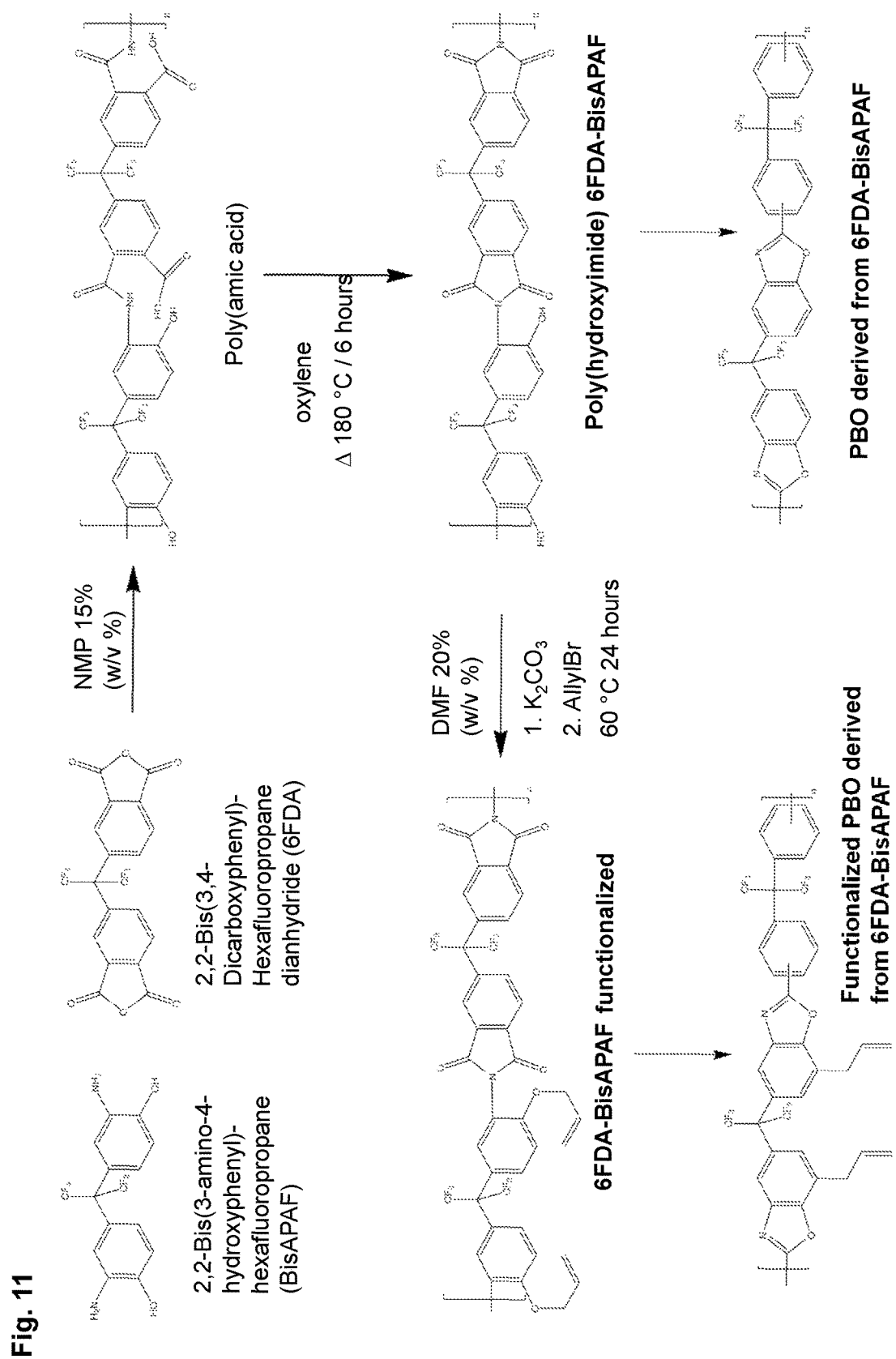

The reaction path is shown in FIG. 11, leading to a functionalized PBO after a functionalization with AllylBr, and to a pristine PBO without the functionalization step.

The TGA scans of the pristine and functionalized PHI in FIG. 10B show that the thermal rearrangement sets in gradually in the pristine case, whereas in the functionalized case, the steep slope causes the function to arrive at a plateau at about 400° C. No such plateau is seen in the pristine case.

As in the case of Example 1 in FIG. 10A, the temperature ranges of thermal rearrangement and thermal degradation have no significant overlap in case of functionalized 6FDA-BisAPAF, while they overlap significantly for the unmodified 6FDA-BisAPAF.

EXAMPLE 3

Figure 10C:
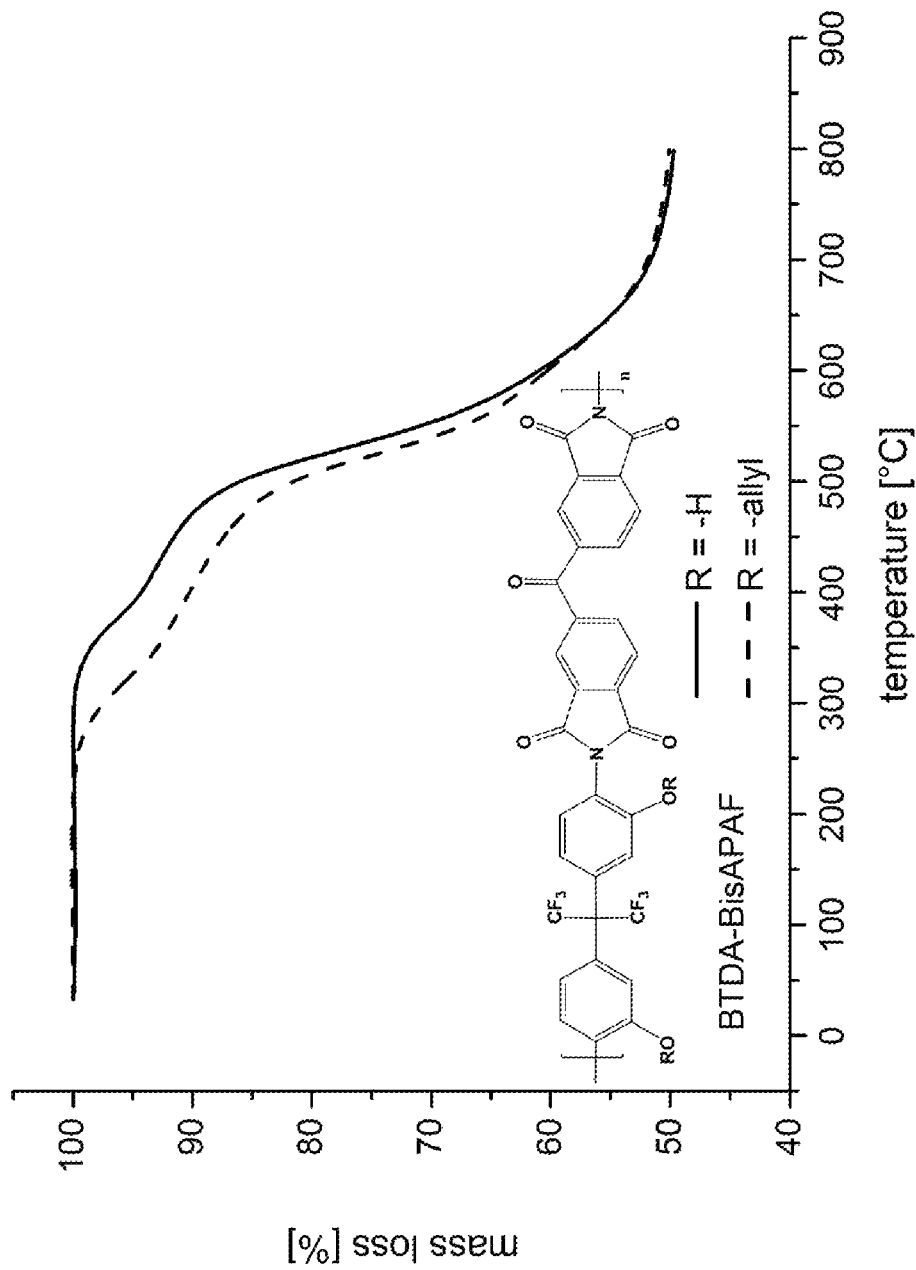

FIG. 10C shows TGA temperature scan results for a pristine and a functionalized precursor PHI which were obtained according to the method described above in Examples 1 and 2 and Comparison Example 1. In contrast to Example 2, the dianhydride is 3,3',4,4'-benzophenone tetracarboxylic dianhydride (BTDA). All other reaction parameters were kept the same. The intermediate poly (hydroxyimide) is named BTDA-BisAPAF.

Figure 12:
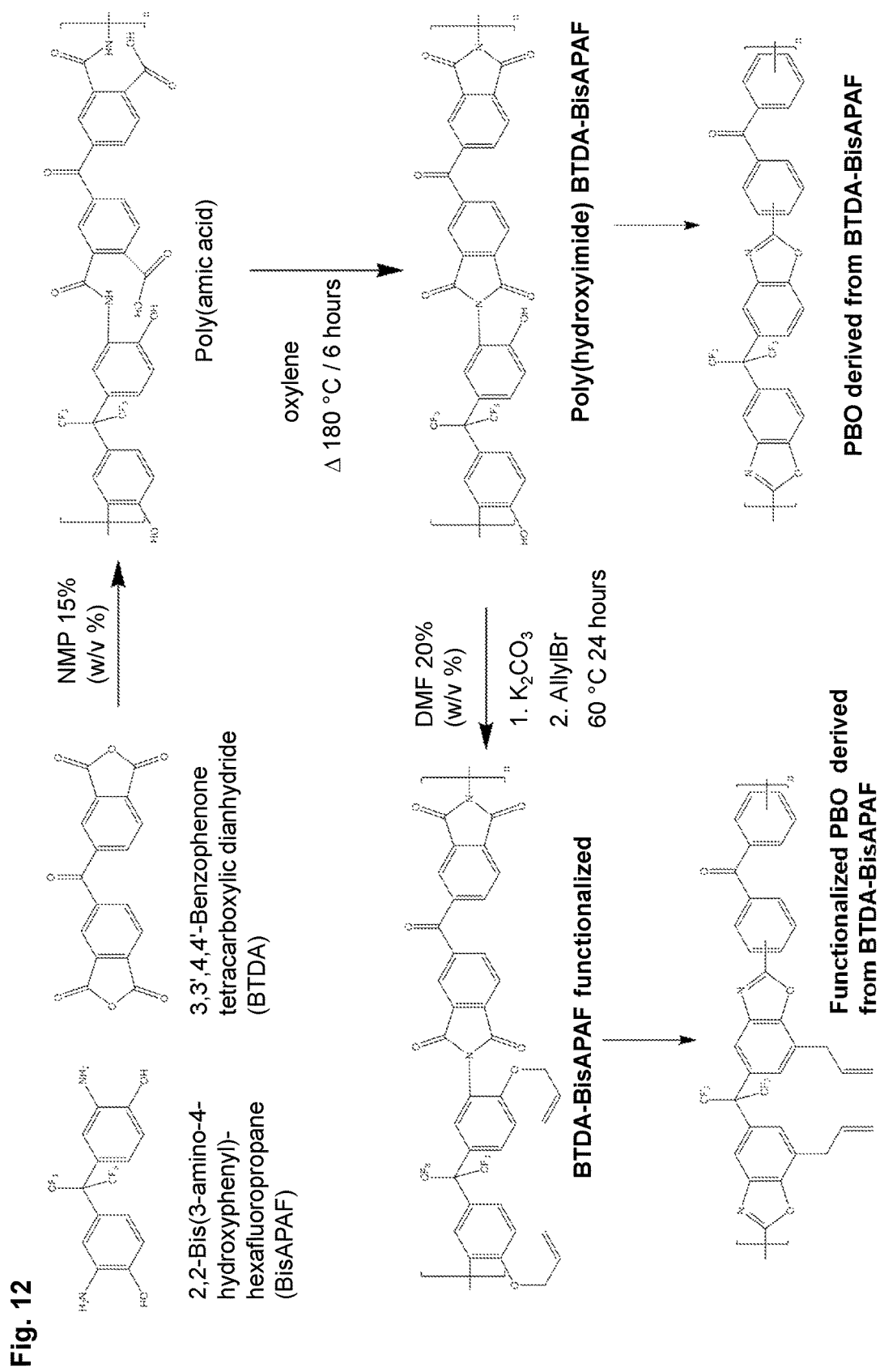
Figure 13:
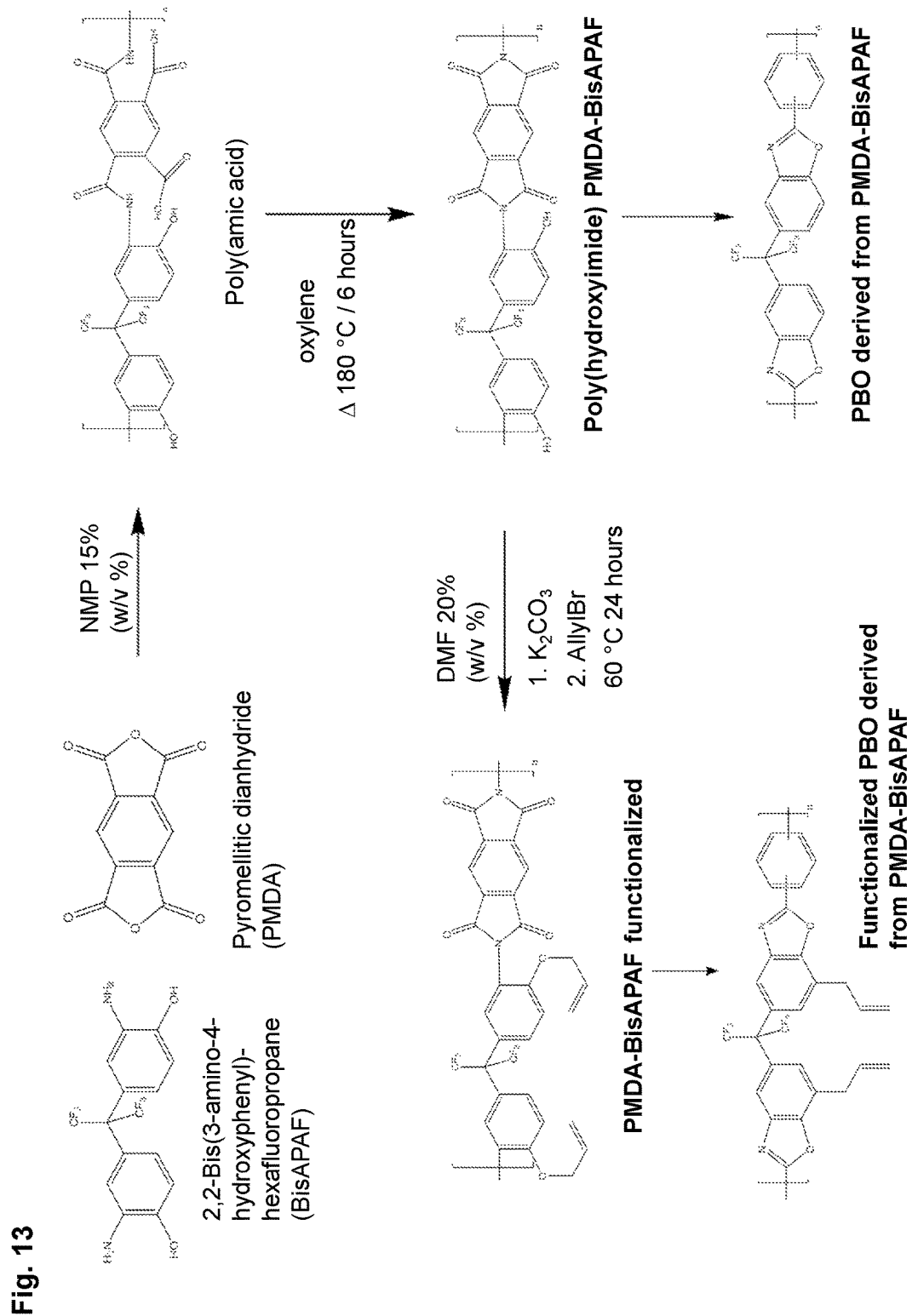

The reaction path is shown in FIG. 12, leading to a functionalized PBO after a functionalization with AllylBr, and to a pristine PBO without the functionalization step.

The TGA scans of the pristine and functionalized PHI in FIG. 10C show that the thermal rearrangement sets in earlier (ca. 260° C.) in the functionalized case than in the pristine case (ca. 320° C.). Both cases develop a plateau-like shallow slope leading into the steep slope of thermal degradation. However, the temperature ranges of thermal rearrangement and thermal degradation have less overlap in case of functionalized BTDA-BisAPAF than in the case of the unmodified BTDA-BisAPAF.

EXAMPLE 4

Figure 10D:
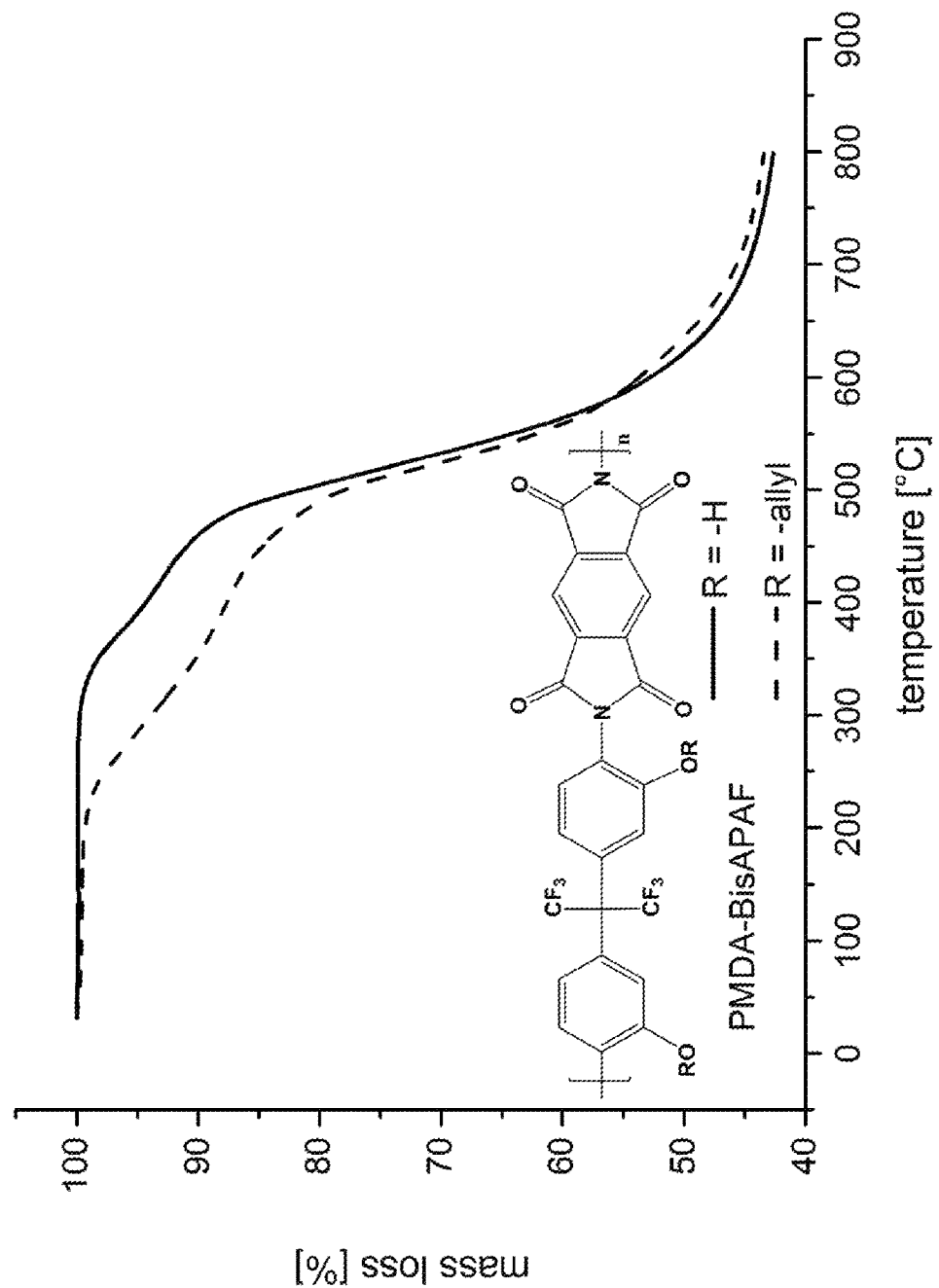

FIG. 10D shows TGA temperature scan results for a pristine and a functionalized PHI which were obtained according to the method described above in Examples 1, 2 and 3 and Comparison Example 1. In contrast to Examples 2 and 3, the dianhydride is pyromellitic dianhydride (PMDA). All other reaction parameters were kept the same. The intermediate poly(hydroxyimide) is named PMDA-BisAPAF.

The reaction path is shown in FIG. 12, leading to a functionalized PBO after a functionalization with AllylBr, and to a pristine PBO without the functionalization step.

The TGA scans of the pristine and functionalized PHI in FIG. 10D show that the thermal rearrangement sets in earlier (ca. 230° C.) in the functionalized case than in the pristine case (ca. 330° C.). Both cases develop a plateau-like shallow slope leading into the steep slope of thermal degradation. However, the temperature ranges of thermal rearrangement and thermal degradation have much less overlap in case of functionalized PMDA-BisAPAF than in the case of the unmodified PMDA-BisAPAF.

The comparison of the TGA scan results shown in FIGS. 10A, 10B, 10C and 10D with each other shows that in each case, weight loss indicating the thermal rearrangement towards the final PBO sets in and is concluded substantially earlier in the functionalized PBO than in the pristine product. FIG. 10B shows the smallest observed temperature difference, but the slope of the weight loss curve in the functionalized case is much steeper than in the pristine sample, indicating that the completion of the thermal rearrangement still occurs at lower temperatures than in the unmodified case.

This slope of the curve could be an indication to how rapidly the thermal rearrangement takes place. The steeper the slope, the more rapidly the thermal rearrangement is carried out.

Accordingly, in each example according to the present invention, the TGA scan of the functionalized PHI shows a plateau which is much more pronounced than in the corresponding unmodified PHI, indicating that there is much less overlap between the temperature ranges for thermal rearrangement on the one hand and thermal degradation on the other hand, showing a benefit of the inventive method in a wide variety of compounds.

All named characteristics, including those taken from the drawings alone, and individual characteristics, which are disclosed in combination with other characteristics, are considered alone and in combination as important to the invention. Embodiments according to the invention can be fulfilled through individual characteristics or a combination of several characteristics. Features which are combined with the wording "in particular" or "especially" are to be treated as preferred embodiments.

The invention claimed is:

1. A method of producing a thermally rearranged polybenzoxazole, polybenzimidazole or polybenzothiazole (TR PBX), including the following method steps:
preparing a polyimide or aromatic polyamide as a precursor polymer in a solution, wherein in each recurring monomer unit of the precursor polymer an aromatic ring is located adjacent to the nitrogen atom of the imide group or amide group of the monomer unit, wherein in some or all of the recurring monomer units the aromatic ring is functionalized with an —XR group as a side chain at the ortho-position to the nitrogen atom, wherein X=O, N or S; and
performing a thermal treatment to carry out a thermal rearrangement resulting in the thermally rearranged polybenzoxazole, polybenzimidazole or polybenzothiazole, wherein R is an allyl group or an allyl-based group, wherein a processing temperature used during the thermal treatment for the thermal rearrangement is in a range of 0° C. and 350° C.

2. The method according to claim 1, wherein the allyl-based group is a group of the chemical formula —$CR_1R_2$—$CR_3$=$CR_4R_5$, wherein $R_1$ to $R_5$ each is a hydrogen atom or a homo- or hetero-aliphatic or -aromatic structure, wherein at least one of $R_1$ to $R_5$ is a homo- or hetero-aliphatic or -aromatic structure.

3. The method according to claim 2, wherein each of the groups $R_1$ to $R_5$ may have up to 20 atoms.

4. The method according to claim 1, wherein a degree of functionalization is between 0.1% and 100%.

5. The method according to claim 1, wherein the precursor polymer is a polyimide synthesized through a reaction between a dianhydride and a diamine, through a reaction between a dianhydride and a diisocyanate or through the ester-acid route with a silylation pre-treatment.

6. The method according to claim 5, wherein the precursor polymer is synthesized through use of solid state thermal imidization, solution thermal imidization or chemical imidization.

7. The method according to claim 5, wherein 3,3'-dihydroxy-4,4'-diamino-biphenyl (HAB) is used as diamine and/or 2,2'-bis-(3,4-dicarboxyphenyl) hexafluoropropane dianhydride (6FDA) is used as dianhydride.

8. The method according to claim 1, wherein the functionalization with an allyl-group or an allyl-based group is performed on a monomer unit before polymerization, during polymerization or on the precursor polymer.

9. The method according to claim 1, wherein at least one of a functionalization agent and an activating agent is introduced during the step of preparing a polyimide or aromatic polyamide as a precursor polymer in a solution.

10. The method according to claim 9, wherein the functionalization agent is allyl halide and/or wherein the activating agent is $K_2CO_3$.

11. The method according to claim 1, characterized in that a solid-state object is produced from the precursor polymer solution prior to the thermal treatment and the thermal treatment resulting in the thermally rearranged polybenzoxazole, polybenzimidazole or polybenzothiazole is carried out on the solid-state object.

12. The method according to claim 11, wherein the solid-state object is a film.

* * * * *